(12) United States Patent
Jan et al.

(10) Patent No.: US 12,516,003 B2
(45) Date of Patent: Jan. 6, 2026

(54) PROCESS FOR CONVERTING OLEFINS TO DISTILLATE FUELS

(71) Applicant: UOP LLC, Des Plaines, IL (US)

(72) Inventors: Deng-Yang Jan, Elk Grove Village, IL (US); Amanda Hickman, Evanston, IL (US); Manuela Serban, Northbrook, IL (US); Eseoghene Jeroro, Chicago, IL (US); Joseph A. Montalbano, Bradenton, FL (US)

(73) Assignee: UOP LLC, Rosemont, IL (US)

( * ) Notice: Subject to any disclaimer, the term of this patent is extended or adjusted under 35 U.S.C. 154(b) by 0 days.

(21) Appl. No.: 18/127,637

(22) Filed: Mar. 28, 2023

(65) Prior Publication Data

US 2023/0348341 A1    Nov. 2, 2023

Related U.S. Application Data

(60) Provisional application No. 63/325,102, filed on Mar. 29, 2022.

(51) Int. Cl.
*C07C 2/24* (2006.01)
*B01J 21/12* (2006.01)
(Continued)

(52) U.S. Cl.
CPC .................. *C07C 2/24* (2013.01); *B01J 21/12* (2013.01); *B01J 23/755* (2013.01); *B01J 35/615* (2024.01);
(Continued)

(58) Field of Classification Search
CPC .... C07C 2/24; C07C 1/24; C07C 5/03; C07C 2523/755; C07C 2529/89; B01J 21/12;
(Continued)

(56) References Cited

U.S. PATENT DOCUMENTS

| 4,433,185 A | 2/1984 | Tabak |
| 8,748,681 B2 * | 6/2014 | Nicholas .................. C07C 2/10 |
| | | 585/512 |

(Continued)

FOREIGN PATENT DOCUMENTS

| JP | 59206485 A | 11/1984 |
| JP | H07118175 A | 5/1995 |
| JP | 2017537994 A | 12/2017 |

OTHER PUBLICATIONS

Search Report and Written Opinion for PCT/US2023/016720 dated Jul. 21, 2023.
Office Action for corresponding Japanese Application No. 2024-556454 dated Aug. 21, 2025.

*Primary Examiner* — Youngsul Jeong
*Assistant Examiner* — Jason Y Chong
(74) *Attorney, Agent, or Firm* — Paschall & Associates, LLC; James C. Paschall

(57) ABSTRACT

A process for oligomerizing an olefin stream with an oligomerization catalyst to produce an oligomerized olefin stream. Oligomerization may comprise a first stage ethylene oligomerization step followed by a second stage oligomerization of the first stage oligomerized olefin to higher olefins. The oligomerized olefin stream can be separated into jet and diesel fuel streams. The olefin stream may be obtained by converting oxygenates to olefins with an MTO catalyst.

19 Claims, 6 Drawing Sheets

(51) Int. Cl.
*B01J 23/755* (2006.01)
*B01J 35/61* (2024.01)
*B01J 35/63* (2024.01)
*B01J 35/64* (2024.01)
*C07C 1/24* (2006.01)
*C07C 5/03* (2006.01)
*C10G 50/00* (2006.01)

(52) U.S. Cl.
CPC ........... *B01J 35/617* (2024.01); *B01J 35/635* (2024.01); *B01J 35/638* (2024.01); *B01J 35/647* (2024.01); *C07C 1/24* (2013.01); *C07C 5/03* (2013.01); *C10G 50/00* (2013.01); *C07C 2523/755* (2013.01); *C07C 2529/89* (2013.01)

(58) Field of Classification Search
CPC .. B01J 23/755; B01J 35/1019; B01J 35/1023; B01J 35/1042; B01J 35/1047; B01J 35/1061; C10G 50/00
See application file for complete search history.

(56) References Cited

U.S. PATENT DOCUMENTS

| | | | |
|---|---|---|---|
| 8,748,682 | B2 | 6/2014 | Nicholas et al. |
| 9,932,531 | B2 | 4/2018 | Lilga et al. |
| 10,358,394 | B2 | 7/2019 | Chellppannair et al. |
| 10,384,986 | B1 | 8/2019 | Chellppannair et al. |
| 10,577,291 | B2 | 3/2020 | Frey et al. |
| 2004/0176651 | A1* | 9/2004 | Molinier ................. B01J 23/66 585/258 |
| 2009/0050531 | A1 | 2/2009 | Rothamel et al. |
| 2016/0168045 | A1* | 6/2016 | Schoenfeldt .............. C07C 4/06 585/324 |
| 2016/0194257 | A1* | 7/2016 | Lilga ........................ B01J 21/12 585/517 |
| 2018/0155637 | A1 | 6/2018 | McCarthy et al. |
| 2019/0283006 | A1* | 9/2019 | Nadolny ................. B01J 23/755 |
| 2020/0291140 | A1 | 9/2020 | Nutt et al. |
| 2021/0009486 | A1 | 1/2021 | Allen et al. |
| 2021/0355048 | A1* | 11/2021 | Li ........................ B01J 29/7046 |

* cited by examiner

PROCESS FOR CONVERTING OLEFINS TO DISTILLATE FUELS

CROSS-REFERENCE TO RELATED APPLICATIONS

This application claims priority from U.S. Provisional Application No. 63/325,102, filed Mar. 29, 2022, which is incorporated herein in its entirety.

FIELD

The field is the conversion of oxygenates to distillate. The field may particularly relate to converting oxygenates to olefins and oligomerizing the olefins to distillate fuels.

BACKGROUND

Carbon dioxide is a so-called greenhouse gas which concentration many desire to suppress in the atmosphere. Carbon dioxide may be converted to oxygenates such as methanol or dimethyl ether. Molecular sieves such as microporous crystalline zeolite and non-zeolitic catalysts, particularly silicoaluminophosphates (SAPO), are known to promote the conversion of oxygenates to hydrocarbon mixtures, particularly hydrocarbon mixtures composed largely of light olefins. The highly efficient Methanol to Olefin (MTO) process may convert oxygenates to light olefins which had been typically considered for plastics production. Light olefins produced from the MTO process is highly concentrated in ethylene.

Light olefin oligomerization is a process that can perform the conversion of C3 through C5 olefins into more desirable products. More specifically, it can convert C4 and C5 olefins into a diesel range product, or distillate. However, depending on the catalyst, the product from the oligomerization may have very poor diesel quality.

Jet fuel is one of the few petroleum fuels that cannot be replaced easily by electrical motor systems because a high energy output is required to fuel planes which cannot be supplied with electric motors. Large incentives are currently available for green jet fuel in certain regions.

An efficient process is desired for converting oxygenates to distillate fuels.

BRIEF SUMMARY

We have formulated a process for converting methanol to distillate fuels comprising contacting an oxygenate stream with an MTO catalyst to produce an olefin stream and oligomerizing the olefin stream with an oligomerization catalyst to produce an oligomerized olefin stream. The olefin stream may be initially oligomerized to provide first stage oligomerized olefins which may be further oligomerized to provide a second stage oligomerized olefin stream. The second stage oligomerized olefin stream can be separated into jet and diesel fuel streams. The olefin stream may be obtained by converting oxygenates to olefins over an MTO catalyst. An ethylene stream may be recycled to the first stage oligomerization step in an embodiment. The oligomerization catalyst may have a silica aluminum oxide support with the aluminum oxide fully dispersed throughout the support.

DEFINITIONS

Figure 1:
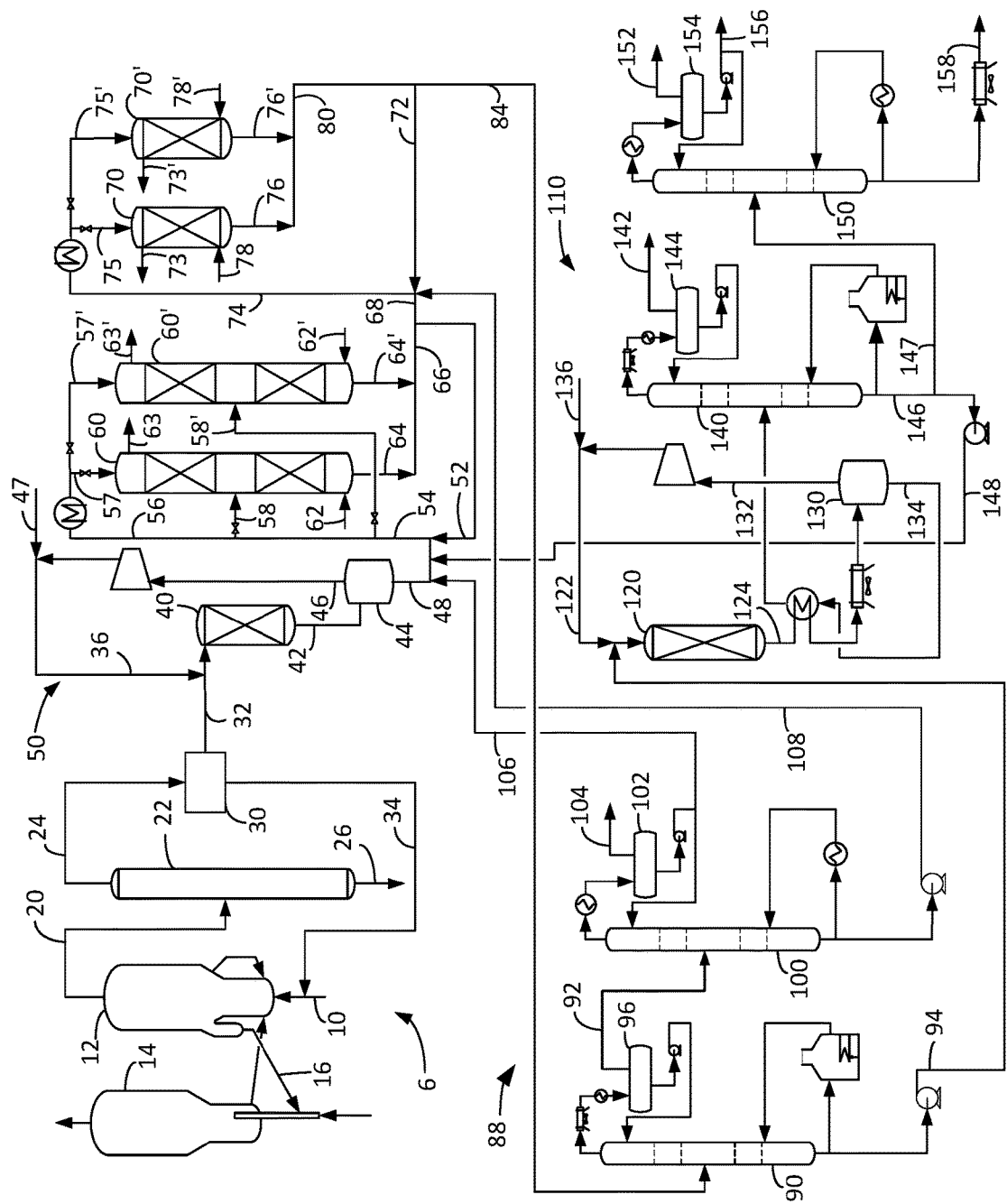
FIG. 1 is a schematic drawing of a process and apparatus of the present disclosure.

The term "communication" means that fluid flow is operatively permitted between enumerated components, which may be characterized as "fluid communication".

The term "downstream communication" means that at least a portion of fluid flowing to the subject in downstream communication may operatively flow from the object with which it fluidly communicates.

The term "upstream communication" means that at least a portion of the fluid flowing from the subject in upstream communication may operatively flow to the object with which it fluidly communicates.

The term "direct communication" means that fluid flow from the upstream component enters the downstream component without passing through any other intervening vessel.

The term "indirect communication" means that fluid flow from the upstream component enters the downstream component after passing through an intervening vessel.

The term "bypass" means that the object is out of downstream communication with a bypassing subject at least to the extent of bypassing.

As used herein, the term "predominant" or "predominate" means greater than 50%, suitably greater than 75% and preferably greater than 90%.

DETAILED DESCRIPTION

In the proposed disclosure, the overall process for converting oxygenates to distillate fuel can be divided into several steps: 1. Production of methanol or dimethyl ether is not included in this disclosure but can be made from carbon dioxide and hydrogen in a process comprising water-gas shift reaction followed by methanol synthesis. 2. Methanol or dimethyl ether may be converted by a MTO process or ethanol can be dehydrated to provide C2 to C6 olefins for the following steps. 3. The C2 to C6 olefins are oligomerized to C9+ distillate that include kerosene and diesel. 4. The C9+ olefinic distillate may be hydrogenated and split into green jet and green diesel products to meet jet fuel specifications.

The process and apparatus may include an MTO section 6, an oligomerization section 50, an olefin recovery section 88 and a hydrogenation section 110. Beginning with the MTO section 6, the process may include charging an oxygenate stream 10 to a MTO reactor 12 and contacting the oxygenate stream with an MTO catalyst at MTO reaction conditions to convert oxygenates to olefins and water. The MTO reactor 12 may provide fluidized catalyst operating at fast fluidized conditions. The oxygenate may be methanol, dimethyl ether, ethanol or combinations thereof. Methanol may be derived from a water gas shift reaction of carbon dioxide with hydrogen followed by methanol synthesis.

The MTO catalysts may be a silicoaluminophosphate (SAPO) catalyst. SAPO catalysts and their formulation are generally taught in U.S. Pat. No. 4,499,327A, 10,358,394, 10,384,986. The MTO catalyst is preferably SAPO-18 which is more suited to producing higher olefins than SAPO-34 which is recognized for producing lighter olefins. The increased higher olefin production of SAPO-18 reduces the amount of processing of the ethylene through oligomerization needed to achieve higher distillate yields. We have found that employing SAPO-18 at higher pressure increases the production ratio of butenes to ethylene (B/E) over SAPO-34 which is typically operated at lower pressure.

The MTO reaction conditions include contact with a SAPO catalyst at a pressure between about 2 MPa and about 3.8 MPA with a partial pressure of methanol being about 200 to about 350 kPa for SAPO-18 catalyst. When using SAPO-34 to catalyze the MTO process, methanol is typically maintained at relatively lower partial pressures, about 100 to about 200 kPa. The MTO reaction temperature should be between about 325 to about 450° C. A weight hourly space velocity ("WHSV") in the MTO reactor is in the range of about 2 to about 15 $hr^{-1}$.

The MTO catalyst is separated from the olefin stream after the MTO reaction, stripped of hydrocarbons with an inert gas such as nitrogen or steam and transported to a regenerator 14 in line 16 in which air is contacted with the spent catalyst to burn coke from the MTO catalyst.

The MTO reactor 12 generates a product olefin stream in line 20. The olefin stream in line 20 may be passed to a dewatering column 22 to cool and separate water from the olefin stream; neutralize acidic compounds and generate a dewatered olefin stream in line 24 with reduced water content, and a water stream in line 26 to pass water for further processing. The dewatering column 22 may comprise two columns. The water stream in line 26 may be further treated to separate further oxygenates that can be recycled to the MTO reactor 12. The dewatered olefin stream in line 24 may be compressed and passed to a dimethyl ether (DME) recovery unit 30, which separates a deoxygenated olefin stream in line 32 and a DME rich stream in line 34 by means of absorption columns. The DME rich stream in line 34 can be recycled to the MTO reactor 10 and converted to olefins over MTO catalyst. The deoxygenated olefin stream in line 32 may be rich in C2-C6 olefins.

The deoxygenated olefin stream in line 32 is oligomerized with an oligomerization catalyst to produce an oligomerized olefin stream comprising C9+ olefins. If the olefin stream has substantial ethylene, it may be initially contacted with a first stage oligomerization catalyst to oligomerize the ethylene to butenes and higher olefins and then contacted with a second stage oligomerization catalyst to oligomerize the first stage oligomerized olefins and un-converted feed olefins to C9+ olefins in an embodiment. The contacting order can be reversed.

The deoxygenated olefin stream in line 32 may be selectively hydrogenated to convert diolefins and acetylenes to mono-olefins. Hydrogen may be added to the light olefin stream in line 36. The selective hydrogenation reactor 40 is normally operated at relatively mild hydrogenation conditions. The light olefin stream will normally be maintained under the minimum pressure sufficient to maintain the reactants as liquid phase hydrocarbons. A broad range of suitable operating pressures therefore extends from about 2.8 barg (40 psig) to about 55 barg (800 psig), or about 3.5 barg (50 psig) to about 21 barg (300 psig). A relatively moderate temperature between about 25° C. (77° F.) and about 350° C. (662° F.), or about 50° C. (122° F.) and about 200° C. (392° F.) is typically employed. The liquid hourly space velocity of the reactants through the selective hydrogenation catalyst should be above about 1.0 $hr^{-1}$ and about 35.0 $hr^{-1}$. To avoid the undesired saturation of a significant amount mono-olefinic hydrocarbons, the mole ratio of hydrogen to diolefinic hydrocarbons in the material entering the bed of selective hydrogenation catalyst is maintained between about 0.75:1 and about 1.8:1.

Any suitable catalyst which is capable of selectively hydrogenating diolefins in a naphtha stream may be used. Suitable catalysts include, but are not limited to, a catalyst comprising copper and at least one other metal such as titanium, vanadium, chrome, manganese, cobalt, nickel, palladium, zinc, molybdenum, and cadmium or mixtures thereof. The metals are preferably supported on inorganic oxide supports such as silica and alumina, for example. The selectively hydrogenated olefin stream may exit the selective hydrogenation reactor in line 42 and enter a hydrogenation separator 44 to provide an overhead stream rich in hydrogen in line 46 that may be compressed, perhaps supplemented with a make-up hydrogen stream in line 47 and returned as recycle hydrogen in line 36. A selectively hydrogenated liquid, feed olefin stream from the bottom of the separator 44 may be transported to an oligomerization unit 50 in line 48. The feed olefin stream in line 48 may comprise at least about 5 wt %, preferably at least about 10 wt % ethylene, suitably at least about 20 wt % and even at least about 25 wt % ethylene. The feed olefin stream in line 48 may predominantly comprise ethylene. The feed olefin stream may also comprise at least about 5 wt %, typically at least about 10 wt %, suitably at least about 20 wt % and even at least about 25 wt % of one or more of C3, C4, C5 and C6 olefins. The feed olefin stream in line 48 may comprise at least about 5 wt %, typically at least about 10 wt %, suitably at least about 20 wt % and even at least about 25 wt % propylene. The feed olefin stream in line 48 may predominantly comprise propylene.

In other embodiments, the feed olefin stream in line 48 may predominantly comprise ethylene and be styled as an ethylene stream. In other embodiments, the feed olefin stream in line 48 may predominantly comprise propylene and be styled as a propylene stream. In other embodiments, the feed olefin stream in line 48 may be a fresh olefin stream comprising ethylene and not originating from the MTO unit 6.

For example, the feed olefin stream may be provided from an ethanol dehydration process. Ethanol may be derived from any known thermal or biological process. Pure ethanol is not required, and aqueous ethanol may be used. For example, the concentration of ethanol may be between 20% and 100%. Ethanol or ethanol-containing feedstocks may be optionally fed to a dehydration reactor optionally with an inert gas such as nitrogen or steam, pre-heated to a selected reaction temperature, and passed over a dehydration catalyst (e.g., alumina, modified alumina, silicoaluminate, modified silicoaluminate, and other catalysts) at a temperature and pressure sufficient to carry out the dehydration reaction that forms ethylene. Ethanol may be introduced to a dehydration reactor at a WHSV of between about 0.1 $hr^{-1}$ to about 30 $hr^{-1}$. In some embodiments, ethanol may be fed to the dehydration reactor at a WHSV of between about 0.5 $hr^{-1}$ to about 5 $hr^{-1}$. The dehydration reactor may be operated at a temperature from about 200° C. to about 500° C. In some embodiments, the dehydration reactor may be operated at a temperature from about 300° C. to about 450° C. In some embodiments, the dehydration reactor may be operated at a pressure from about 0 barg to about 83 barg. In some embodiments, the dehydration reactor may be operated at a pressure from about 0 barg to about 35 barg. Ethanol conversion may vary depending on operating conditions and the selected catalyst from between about 10% and about 100%. The ethylene-containing product may be purified to remove water, by-products, oxygen, and other impurities. Purification could include condensing water and purifying the product through a purifying adsorbent such as silicas, molecular sieves, and carbons. The purified ethanol may be collected or passed directly to the oligomerization unit 50 as the feed olefin stream in line 48.

The oligomerization unit 50 may comprise a first stage oligomerization reactor 60 and a second stage oligomerization reactor 70. A light olefin splitter overhead line 106 transporting un-converted feed olefins, a diluent stream comprising paraffins which may be a net stripped hydrogenated stream in line 148 and a first stage oligomerization recycle stream in line 52 comprising the first stage oligomerization olefins may be added to the feed olefin stream in line 48 to provide a charge olefin stream in line 54. The charge olefin stream in line 54 may supply a primary charge olefin stream in line 56, and an interbed olefin charge stream in line 58. The primary charge olefin stream in line 56 may be heated and charged to the first stage oligomerization reactor 60.

The diluent stream may comprise a paraffin stream that absorbs the exothermic heat generated by the oligomerization reaction. The diluent stream may be provided at a diluent-to-feed ratio of 1:1 to 6:1 and suitably 2:1 to 5:1. The diluent stream is preferably a C9+ paraffin stream that may be taken from a stripper bottoms stream in line 146 downstream of hydrogenation. The diluent stream may also be a light paraffin stream.

The lead reactor preferably contains two fixed catalyst beds, where the majority of ethylene and some propylene and higher olefin also are converted. The primary charge olefin stream is charged to the first catalyst bed in line 57 preferably in a down flow operation. However, upflow operation may be suitable. As the conversion of ethylene occurs in the first catalyst bed, an exotherm is generated. Therefore, suitable heat exchange media are selected to control the heat of reaction. The interbed olefin charge stream is charged by line 58 into the reactor 60 at an interbed location to cool the first stage oligomerized effluent from the first bed. In an embodiment, the effluent from the first catalyst bed may be withdrawn from the first catalyst bed combined with interbed olefin charge stream in line 58, cooled in a heat exchanger such as a steam generator and returned to the second catalyst bed. The first stage oligomerized olefins exit the first stage oligomerization reactor 60 in line 64.

The ethylene conversion catalyst is preferably an amorphous silica-alumina base with a metal from either Group VIII and optionally Group VIB in the periodic table using Chemical Abstracts Service notations. In an aspect, the catalyst has a Group VIII metal promoted with a Group VIB metal. Typically, the silica and alumina will only be in the base, so the silica-to-alumina ratio will be the same for the catalyst as for the base. The metals can either be impregnated onto or ion exchanged with the silica-alumina base. Co-mulling is also contemplated. Additionally, a suitable catalyst will have a surface area of between about 300 and about 600 $m^2$/g as determined by nitrogen BET.

The most preferred first stage oligomerization catalyst is described as follows. The preferred ethylene conversion catalyst comprises an amorphous silica-alumina support. The compositions of amorphous silica alumina range from about 40 to about 99.5 wt % $SiO_2$, suitably at least about 70 wt %, and preferably about 75 wt % to about 97.5 wt % $SiO_2$ with the balance being alumina. More preferably, compositions of amorphous silica alumina range from about 87 to about 98 wt % $SiO_2$ with the balance being alumina.

The amorphous silica alumina support for the catalyst is most preferably prepared using an oil dropping process, where the synthesis of amorphous silica alumina and support for the catalyst shape formation are accomplished in the single, continuous manufacturing process described in U.S. Pat. Nos. 3,909,450; 4,629,717 and 5,139,989. In the oil dropping process, the amorphous silica alumina was synthesized online by intensely mixing the silica and alumina precursors to ensure silica and alumina were atomically inter-dispersed. An appropriate level of neutralization reagents such as hexamethylenetetramine (HMT), urea, ammonia or the combinations thereof, was introduced at ambient temperatures during the aforementioned mixing step. The resulting premix is dropped into a hot oil bath via a vibrating dropping head, where the premix droplets are converting from the sol to gel states via the activation of the gelling reagent in the hot oil bath. The formed spherical droplets are aged to establish the architecture of porous structures, and subsequently water washed under controlled pH to remove residual oils and alkali and alkali earth metals associated with silica and alumina precursors going into the syntheses. Alternatively, the water wash is performed without removing all the alkali or alkali earth cations associated with the silica and alumina precursors, imparting ion exchanged sites for the subsequent metal incorporation via the ion exchange procedure. By selecting and controlling levels of gelling reagents, solid contents and the aging conditions including the pressures, temperatures and times, one can tailor the support properties to obtain the attributes required of catalytic processes.

When using amorphous silica alumina as a support to disperse metals for ethylene conversions, for example, alumina needs to be fully dispersed into silica. This is accomplished by oil dropping sol compositions having greater than about 70 to about 75 wt % of $SiO_2$. When alumina is not fully dispersed into silica matrix, the alumina phase would interact with metals to form spinels, for example, resulting in losses of ethylene conversion reactivity. Amorphous silica alumina synthesized as per the prescribed processes combine the syntheses and shape formation in one single, continuous step. Therefore, compositional homogeneity is achieved with aluminum oxide being fully dispersed into the silica matrix as indicated by x-ray diffraction patterns indicated by an absence of the crystalline alumina phase. In other words, the composition of the support is uniform on the surface of the support throughout the core of the support.

The sphere sizes may range from about 1/32 to about 1/10 inches in diameter, preferably from about 1/20 to about 1/12 inches in diameter. The porosity of the support as measured by total intrusion volumes by mercury intrusion techniques ranges from about 0.40 to about 1.4 ml/g, preferably from about 0.45 to about 1.2 ml/g and most preferably from about 0.60 to about 1.2 ml/g. Porosity should be between about 50 and about 80%.

Groups VIII and optionally Group VI and Group IA and IIA elements can be incorporated onto the supports via ion exchange or impregnation techniques. Group VIII elements preferably comprise nickel. Group VI elements preferably comprise of chromium, molybdenum and tungsten. Group IA elements preferably comprise lithium, sodium, potassium and combinations thereof. Group IIA elements comprise of magnesium, calcium, strontium and combination thereof. Another suitable first stage oligomerization catalyst comprises an amorphous silica-alumina support. One of the components of this first stage oligomerization catalyst support utilized in the present disclosure is alumina. The alumina may be any of the various hydrous aluminum oxides or alumina gels such as alpha-alumina monohydrate of the boehmite or pseudo-boehmite structure, alpha-alumina trihydrate of the gibbsite structure, beta-alumina trihydrate of the bayerite structure, and the like. A particularly preferred alumina is available from Sasol North America Alumina Product Group under the trademark, "Catapal". This material is an extremely high purity alpha-alumina monohydrate (pseudo-boehmite) which after calcination at a high temperature has been shown to yield a high purity gamma-alumina. Another component of the catalyst support is an amorphous silica-alumina. The preferred compositions of amorphous silica alumina range from about 70 to about 99.5 wt % $SiO_2$ with the balance being alumina. More preferably, compositions of amorphous silica alumina range from about 87 to about 98 wt % $SiO_2$ with the balance being alumina. A suitable silica-alumina with a silica-to-alumina ratio of about 4.0 such as the one available from CCIC, a subsidiary of JGC, Japan. Suitable silica-alumina has a silica-to-alumina molar ratio from about 4.0 to about 300 and can be synthesized using a batch or continuous process using a co-gel or sequential procedure with a balanced cation and anion, followed by aging, spray dry, and water wash. Proper ageing at pH of about 6 to about 8 is preferred to attain pore textures with favorable mass transport properties. This catalyst support will have a crystalline alumina phase throughout the support.

Another component utilized in the preparation of the catalyst utilized in the present disclosure is a surfactant. The surfactant is preferably admixed with the hereinabove described alumina and the silica-alumina powders. The resulting admixture of surfactant, alumina and silica-alumina is then formed, dried and calcined as hereinafter described. The calcination effectively removes by combustion the organic components of the surfactant but only after the surfactant has dutifully performed its function in accordance with the present invention. Any suitable surfactant may be utilized in accordance with the present invention. A preferred surfactant is a surfactant selected from a series of commercial surfactants sold under the trademark "Antarox" by Solvay S. A. The Antarox surfactants are generally characterized as modified linear aliphatic polyethers and are low-foaming biodegradable detergents and wetting agents.

A suitable silica-alumina mixture is prepared by mixing proportionate volumes silica-alumina and alumina to achieve the desired silica-to-alumina ratio. In an embodiment, about 75 to about 95 wt-% amorphous silica-alumina with a silica-to-alumina ratio of about 4.0 to about 300 with about 10 to about 20 wt-% alumina powder will provide a suitable support. In an embodiment, other ratios of amorphous silica-alumina to alumina may be suitable.

Any convenient method may be used to incorporate a surfactant with the silica-alumina and alumina mixture. The surfactant is preferably admixed during the admixture and formation of the alumina and silica-alumina. A preferred method is to admix an aqueous solution of the surfactant with the blend of alumina and silica-alumina before the final formation of the support. It is preferred that the surfactant be present in the paste or dough in an amount from about 0.01 to about 10 wt-% based on the weight of the alumina and silica-alumina.

Monoprotic acid such as nitric acid or formic acid may be added to the mixture in aqueous solution to peptize the alumina in the binder. Additional water may be added to the mixture to provide sufficient wetness to constitute a dough with sufficient consistency to be extruded or spray dried.

The paste or dough may be prepared in the form of shaped particulates, with the preferred method being to extrude the dough mixture of alumina, silica-alumina, surfactant and water through a die having openings therein of desired size and shape, after which the extruded matter is broken into extrudates of desired length and dried. A further step of calcination may be employed to give added strength to the extrudate. Generally, calcination is conducted in a stream of dry air at a temperature from about 260° C. (500° F.) to about 815° C. (1500° F.).

The extruded particles may have any suitable cross-sectional shape, i.e., symmetrical or asymmetrical, but most often have a symmetrical cross-sectional shape, preferably a spherical, cylindrical or polylobal shape. The cross-sectional diameter of the particles may be as small as m; however, it is usually about 0.79 mm (1/32 inch) to about 6.35 mm (0.25 inch), and most preferably about 0.06 mm (1/24 inch) to about 4.23 mm (1/6 inch).

Typical characteristics of the amorphous silica-alumina supports utilized herein are a total pore volume, average pore diameter and surface area large enough to provide substantial space and area to deposit the active metal components. The total pore volume of the support, as measured by conventional mercury porosimeter methods, is usually about 0.2 to about 2.0 cc/g, preferably about 0.25 to about 1.0 cc/g and most preferably about 0.3 to about 0.9 cc/g. Surface area, as measured by the B.E.T. method, is typically above 50 $m^2/g$, e.g., above about 200 $m^2/g$, preferably at least 250 $m^2/g$, and most preferably about 300 $m^2/g$ to about 550 $m^2/g$.

The most preferred first stage oligomerization catalyst is a calcined amorphous refractory oxide support particles in the form of oil dropped spheres, which contain metals from Group VIII in molar ratio concentrations of from about 0.04 to about 0.70 $M_8/Al_2$ ($M_8$=Group VIII). The Group VIII element is preferably nickel. The catalyst preferably contains Group IA and optionally Group IIA elements with $M_{IA}/Al$ ($M_{IA}$=Group IA) being greater than about 0.04 and less than about 0.4. Optionally, the catalyst also contains metals of Group VIB of the periodic table, preferably tungsten in a concentration of about 0 to about 12 wt-%.

The metal incorporation may be accomplished by any method known in the art, as for example, by ion exchange, evaporative impregnation or pore fill/spray impregnation. Ion exchanges of Group VIII elements are performed using inorganic precursor such as nickel nitrate in the absence or presence of complexing reagents such as ethylene diamine (EDA). The ion exchanges are performed with alkali nitrate first, followed by the ion exchange of nickel nitrate. The ion exchanges can be performed with solution containing both nickel and alkali nitrates. The impregnation can be performed in a sequential or simultaneous fashion preferably with a solution to support ratio greater than 1.0 on a volumetric basis to ensure the ion exchange process takes place in the impregnation operation.

Subsequent to metal incorporation, the catalyst is subjected to heat treatment in the flowing inert gas such as helium and nitrogen or in an oxidizing gases such as air. The heat treatment is conducted at temperatures greater than about 300° C. and less than about 700° C., and preferably more than 400° C. and less than about 550° C., to decompose metal precursors and to remove physi- and chemisorbed water, for durations from about 30 minutes to about 12 hours.

The first stage oligomerization catalyst can be regenerated upon deactivation. Suitable regeneration conditions include subjecting the catalyst, for example, in situ, to hot air from about 450 to about 550° C. for 3 hours. To facilitate regeneration without downtime, a swing bed arrangement is employed with an alternative first stage oligomerization reactor 60'. When the first stage oligomerization catalyst in the first stage oligomerization reactor 60 is deactivated, valves on the primary charge line 57 and on the interbed charge line 58 to the first stage oligomerization reactor 60 are closed and valves on an alternative primary charge line 57' and on an alternative interbed charge line 58' are opened to charge the olefin stream to the alternative the first stage oligomerization reactor 60'. A regeneration gas stream from line 62 is then admitted to the first stage oligomerization reactor 60 requiring regeneration. The regeneration gas may comprise air with an increased or decreased concentration of oxygen. The alternative first stage oligomerization reactor 60' can be regenerated in the reverse way by shutting the valves on line 57' and 58' and admitting regeneration gas from line 62'. Each first stage oligomerization reactor 60, 60' may include a vent line 63, 63', respectively, for exhausting regeneration flue gas. Activity and selectivity of the regenerated catalyst is comparable to fresh catalyst.

A first stage oligomerized olefin stream in line 66 is collected from lines 64 and 64' with an increased butene concentration compared to the charge olefin stream in line 54 and is split between a first stage oligomerized recycle stream in line 52 and a charge second stage oligomerized olefin stream in line 68. An intermediate olefin stream in a net light olefin splitter bottoms line 108 comprising C3-C8 olefins and an oligomerized recycle stream in line 72 comprising oligomerized olefins may be added to the charge second stage oligomerized olefin stream in line 68 to provide a charge second stage oligomerization olefin stream in line 74. The charge second stage oligomerization olefin stream in line 74 may be cooled and charged to the second stage oligomerization reactor 70 in line 75. The second stage oligomerization reactor 70 may be in downstream communication with the first stage oligomerization reactor 60. The second stage oligomerization reactor 70 preferably operates in a down flow operation. However, upflow operation may be suitable. The charge second stage oligomerization olefin stream is contacted with the second stage oligomerization catalyst causing the C2-C8 olefins to oligomerize to provide distillate range olefins. A second stage oligomerized stream with an increased average carbon number greater than the charge second stage oligomerization olefin stream in line 74 exits the second stage oligomerization reactor 70 in line 76.

The second stage oligomerization catalyst may include a zeolitic catalyst. The zeolite may comprise between about 5 and about 95 wt % of the catalyst, for example between about 5 and about 85 wt %. Suitable zeolites include zeolites having a structure from one of the following classes: MFI, MEL, ITH, IMF, TUN, FER, BEA, FAU, BPH, MEI, MSE, MWW, UZM-8, UZM-8HS, UZM-37, MOR, OFF, MTW, MRE, MFS, TON, MTT, AFO, ATO, and AEL. Three-letter codes indicating a zeotype are as defined by the Structure Commission of the International Zeolite Association and are maintained at http://www.iza-structure.org/databases. UZM-8 is as described in U.S. Pat. No. 6,756,030. In a preferred aspect, the oligomerization catalyst may comprise a zeolite with a framework having a ten-ring pore structure. Examples of suitable zeolites having a ten-ring pore structure include TON, MTT, MFS, MRE, MFI, MEL, AFO, AEL, EUO and FER. In a further preferred aspect, the second stage oligomerization catalyst comprising a zeolite having a ten-ring pore structure may comprise a uni-dimensional pore structure. A uni-dimensional pore structure indicates zeolites containing non-intersecting pores that are substantially parallel to one of the axes of the crystal. The pores preferably extend through the zeolite crystal. Suitable examples of zeolites having a ten-ring uni-dimensional pore structure may include MTT. In a further aspect, the oligomerization catalyst comprises an MTT zeolite. A suitable silica-to-alumina ratio of the MTT zeolite is about 30 to about 100.

The second stage oligomerization catalyst may be formed by combining the zeolite with a binder, and then forming the catalyst into pellets. The pellets may optionally be treated with a phosphorus reagent to create a zeolite having a phosphorous component between 0.5 and 15 wt % of the treated catalyst. The binder is used to confer hardness and strength on the catalyst. Binders include alumina, aluminum phosphate, silica, silica-alumina, zirconia, titania and combinations of these metal oxides, and other refractory oxides, and clays such as montmorillonite, kaolin, palygorskite, smectite and attapulgite. A preferred binder is an aluminum-based binder, such as alumina, aluminum phosphate, silica-alumina and clays.

One of the components of the catalyst binder utilized in the present disclosure is alumina. The alumina source may be any of the various hydrous aluminum oxides or alumina gels such as alpha-alumina monohydrate of the boehmite or pseudo-boehmite structure, alpha-alumina trihydrate of the gibbsite structure, beta-alumina trihydrate of the bayerite structure, and the like. A suitable alumina is available from UOP LLC under the trademark, "VERSAL". A preferred alumina is available from Sasol North America Alumina Product Group under the trademark, "Catapal". This material is an extremely high purity alpha-alumina monohydrate (pseudo-boehmite) which after calcination at a high temperature has been shown to yield a high purity gamma alumina.

A suitable second stage oligomerization catalyst is prepared by mixing proportionate volumes of zeolite and alumina to achieve the desired zeolite-to-alumina ratio. In an embodiment, the zeolite content may contain about 5 to about 90, for example about 10 to about 85 wt % and suitably about 25 to about 75 wt % zeolite, and the balance alumina powder will provide a suitably supported catalyst. A silica support is also contemplated. In one exemplary embodiment, an MTT-type zeolite catalyst disposed on a high purity pseudo boehmite alumina substrate in a ratio of about 10/90 to about 90/10 and preferably between about 25/75 and about 75/25 is provided within the oligomerization reactor 70.

Monoprotic acid such as nitric acid or formic acid may be added to the mixture in aqueous solution to peptize the alumina in the binder. Additional water may be added to the mixture to provide sufficient wetness to constitute a dough with sufficient consistency to be extruded or spray dried. Extrusion aids such as cellulose ether powders can also be added. A preferred extrusion aid is available from The Dow Chemical Company under the trademark "Methocel".

The paste or dough may be prepared in the form of shaped particulates, with the preferred method being to extrude the dough through a die having openings therein of desired size and shape, after which the extruded matter is broken into extrudates of desired length and dried. A further step of calcination may be employed to give added strength to the extrudate. Generally, calcination is conducted in a stream of air at a temperature from about 260° C. (500° F.) to about 815° C. (1500° F.). The MTT catalyst is not selectivated to neutralize acid sites such as with an amine.

The extruded particles may have any suitable cross-sectional shape, i.e., symmetrical or asymmetrical, but most often have a symmetrical cross-sectional shape, preferably a spherical, cylindrical or polylobal shape. The cross-sectional diameter of the particles may be as small as m; however, it is preferably about 0.79 mm (1/32 inch) to about 6.35 mm (0.25 inch), and most preferably about 1.06 mm (1/24 inch) to about 4.23 mm (1/6 inch).

With regard to the oligomerization reactor 70, process conditions are selected to produce a higher percentage of jet range olefins which, when hydrogenated in a subsequent step as will be described below, result in a desirable jet-range hydrocarbon product. In one exemplary embodiment, an MTT-type zeolite catalyst disposed on a high purity pseudo boehmite alumina substrate in a ratio of about 70/30 to about 90/10 and preferably between about 75/25 and about 85/15 is provided within the oligomerization reactor 70. The charge first stage oligomerized olefin stream in line 74 is cooled and charged to the oligomerization reactor 70. To achieve the most desirable olefin product, the oligomerization reactor 70 is run at a temperature from about 100° C. to about 270° C., and more preferably from about 111° C. to about 230° C. The second stage oligomerization reactor 70 is run at a pressure from about 21 barg (300 psig) to about 69 barg (1000 psig), and more preferably from about 49 barg (710 psig) to about 63 barg (900 psig).

When the second stage oligomerization reaction is performed according to the above-noted process conditions, a C4 olefin conversion of greater than or equal to about 95% is achieved, or greater than or equal to 97%. The resulting second stage oligomerized olefin stream in line 76 includes a plurality of olefin products that are distillate range hydrocarbons. In general nickel containing catalysts operate at relatively lower temperatures than zeolite catalysts. It is preferable to operate nickel containing catalysts at inlet temperatures that are about 50 to about 150° C. lower than inlet temperatures of zeolite containing catalysts depending on ethylene content of the feed. Furthermore, the contact times for nickel containing catalysts are shorter than those of zeolite catalyst. Therefore, it is preferable that the contact times with respect to nickel containing catalysts would be less than 45% and most preferably less than 35% of overall contact times.

The second stage oligomerization catalyst can be regenerated upon deactivation. Suitable regeneration conditions include subjecting the oligomerization catalyst, for example, in situ, to hot air at 500° C. for 3 hours. To facilitate regeneration without downtime, a swing bed arrangement is employed with an alternative second stage oligomerization reactor 70'. When the second stage oligomerization reactor 70 is deactivated, valves on the cooled charge line 75 to the second stage oligomerization reactor 70 are closed and valves on an alternative cooled charge line 75' are opened to charge the second stage charge oligomerization olefin stream to the alternative second stage oligomerization reactor 70'. A regeneration gas stream from line 78 is then admitted to the second stage oligomerization reactor 70 requiring regeneration. The regeneration gas may comprise air with an increased or decreased concentration of oxygen. The alternative second stage oligomerization reactor 70' can be regenerated in the reverse way by shutting the valves on line 75' and admitting regeneration gas from line 78'. Each second stage oligomerization reactor 70, 70' may include a vent line 73, 73', respectively, for exhausting regeneration flue gas. Activity and selectivity of the regenerated catalyst is comparable to fresh catalyst.

A second stage oligomerized olefin stream in line 80 collected from lines 76, 76' with an increased C9+ olefin concentration compared to the charge second stage oligomerization olefin stream in line 74 is split between a second stage oligomerized recycle stream in line 72 and an second stage oligomerized product stream in line 84.

The second stage oligomerized product stream from the oligomerization unit 50 is conveyed to the olefin recovery section 88 in which it is fed to a heavy olefin splitter column 90. In the heavy olefin splitter column 90 oligomers that boil lower than the jet range hydrocarbons, typically C8– hydrocarbons with atmospheric boiling points less than about 150° C., are separated in a net heavy olefin splitter overhead stream in line 92 from a net heavy olefin splitter bottoms stream in line 94 comprising distillate-range C9+ hydrocarbons, typically C9-C20 olefins. The heavy olefin splitter column 90 may be operated at a bottoms temperature of about 300° C. to about 500° C. and an overhead pressure of about 9 barg to about 15 barg. The heavy olefin splitter overhead stream may be condensed and taken as a net vapor overhead from the heavy olefin splitter receiver 96 in line 92.

The C8– net vapor heavy olefin splitter overhead stream in line 92 may be fed to a light olefin splitter column 100. The light olefin splitter overhead stream may be chilled and separated in a light olefin splitter overhead receiver 102 into a net vapor overhead stream in line 104 comprising methane and lighter off gases and a net liquid light olefin splitter overhead stream in line 106 comprising ethylene. The net liquid light olefin splitter overhead stream in line 106 may recycle un-converted ethylene to the feed olefin stream in line 48 along with the diluent stream in line 148 and the first stage oligomerized recycle stream in line 52 to provide the charge olefin stream in line 54 to the first stage oligomerization reactor 60. The net liquid light olefin splitter overhead stream may predominantly comprise ethylene that can be recycled to the first stage oligomerization reactor 60. In an alternative embodiment, the net liquid olefin splitter overhead stream may predominantly comprise propylene that can be recycled to the first stage oligomerization reactor 60. In this case, ethylene would still be taken in the net liquid light olefin splitter overhead stream in line 106. An intermediate olefin stream in a net light olefin splitter bottoms line 108 comprising C3-C8 or C4-C8 olefins may be recycled to join the charge second stage oligomerized olefin stream in line 68 along with the oligomerized recycle stream in line 72 to provide the charge second stage oligomerization olefin stream in line 74 to be oligomerized in the second stage oligomerization reactor 70. Drag streams may be taken from lines 106 and lines 108. The light olefin splitter column 100 may be operated at a bottoms temperature of about 100° C. to about 300° C. and an overhead pressure of about 5 barg to about 11 barg.

The net heavy olefin splitter bottoms stream in line 94 comprising distillate-range C9+ olefins may be hydrogenated to provide motor fuels to saturate the olefinic bonds in a hydrogenation reactor 120. This step is performed to ensure the product motor fuel meets or exceeds the thermal oxidation requirements specified in ASTM D7566-10a for hydroprocessed synthesized paraffinic kerosene (SPK) and applicable requirements for diesel. Hydrogenation is typically performed using a conventional hydrogenation or hydrotreating catalyst, and can include metallic catalysts containing, e.g., palladium, rhodium, nickel, ruthenium, platinum, rhenium, cobalt, molybdenum, or combinations thereof, and the supported versions thereof. Catalyst supports can be any solid, inert substance including, but not limited to, oxides such as silica, alumina, titania, calcium carbonate, barium sulfate, and carbons. The catalyst support can be in the form of powder, granules, pellets, or the like.

A stream of hydrogen is provided in line 122 as the source for hydrogen to the hydrogenation reactor 120.

In an exemplary embodiment, hydrogenation is performed in the hydrogenation reactor 120 that includes a platinum-on-alumina catalyst, for example about 0.5 wt % to about 0.9 wt % platinum-on-alumina catalyst. Using this catalyst, hydrogenation suitably occurs at a temperature of about 125 to about 175° C. and at a pressure of about 35 barg (500 psig) to about 105 barg (1500 psig). According to these process conditions, the hydrogenation reactor 120 converts the olefins into a paraffin product having the same carbon number distribution as the olefins, thereby forming distillate-range paraffins suitable for use as jet and diesel fuel.

The hydrogenated distillate stream discharged from the hydrogenation reactor 120 in line 124 may be cooled and fed to a hydrogenation separator 130. In the hydrogenation separator 130, the hydrogenated distillate stream is separated into a hydrogenated separator vapor stream in an overhead line 132 and a hydrogenated separator liquid stream in a bottoms line 134. The hydrogenated separator vapor stream in line 132 may be compressed and combined with make-up hydrogen in line 136 to provide the hydrogen stream in line 122 and/or the hydrogen stream in line 36 for the selective hydrogenation reactor 40. The hydrogenated separator liquid stream in the bottoms line 134 may be heated by heat exchange with the hydrogenated distillate stream in line 124 and fed to a stripper column 140.

The stripper column 140 strips light gases from the hydrogenated separator liquid stream to provide a stripper off gas stream in off gas line 142 from a stripper overhead receiver 144. A net stripped hydrogenated stream in a stripper bottoms line 146 is split between a product fuel stream in line 147 and a diluent stream in line 148. The diluent stream in line 148 can be recycled to the feed olefin stream in line 48 along with light olefin splitter overhead stream 106 and the first stage oligomerized recycle stream in line 52 to provide the charge olefin stream in line 54. The diluent stream is inert in an oligomerization reactor and serves to absorb the exotherm in the first stage oligomerization reactors 60, 60' and the second stage oligomerization reactors 70, 70'. The stripper column 140 may be operated at a bottoms temperature of about 250° C. to about 500° C. and an overhead pressure of about 2 barg to about 8 barg.

The product fuel stream in line 147 may be fed to the jet fractionation column 150 to be separated into an off-gas stream in an overhead line 152 from a jet receiver overhead 154, a green jet fuel stream from the jet receiver bottoms line 156 and a green diesel stream in the net diesel bottoms line 158. Both the jet fuel stream in line 156 and the diesel stream in line 158 can be fed to their respective fuel pools. The jet fractionation column 150 may be operated at a bottoms temperature of about 350° C. to about 600° C. and an overhead pressure of about 1 barg to about 5 barg.

Figure 2:
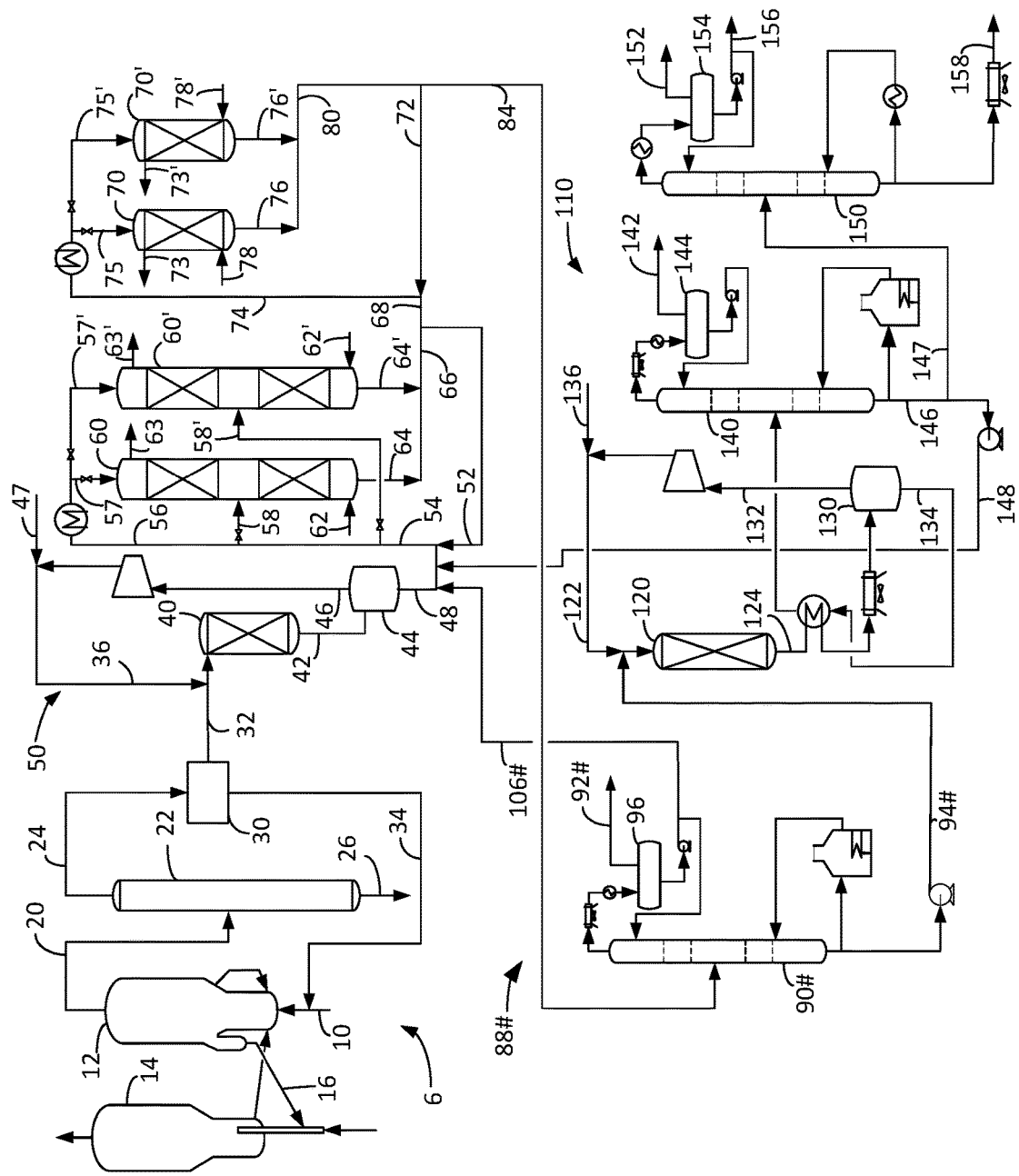
FIG. 2 is a schematic drawing of an alternative process and apparatus of the present disclosure.

In an alternative embodiment in FIG. 2, only a single olefin splitter column 90 # is employed in the olefin recovery section 88 #. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a hashtag symbol (#). The configuration and operation of the embodiment of FIG. 2 is essentially the same as in FIG. 1 with the following exceptions.

The olefin splitter column 90 # in FIG. 2 separates dimers and oligomers that boil lower than the jet range hydrocarbons, typically C8− hydrocarbons with atmospheric boiling points less than about 150° C., in a net olefin splitter overhead stream in line 92 # from a net olefin splitter bottoms stream in line 94 # comprising distillate-range C9+ hydrocarbons, typically C9-C20 olefins. The olefin splitter column 90 # may be operated at a bottoms temperature of about 100° C. to about 500° C. and an overhead pressure of about 5 barg to about 15 barg. The olefin splitter overhead stream may be condensed and taken as a net liquid overhead stream from the olefin splitter receiver 96 in line 106 #. The net liquid olefin splitter overhead stream in line 106 # may recycle un-converted ethylene and oligomers to the feed olefin stream in line 48 along with the diluent stream in line 148 and the first stage oligomerized recycle stream in line 52 to provide the charge olefin stream in line 54 to the first stage oligomerization reactor 60. The net liquid light olefin splitter overhead stream in line 106 # may comprise at least about 10 wt %, suitably at least about 20 wt % and preferably at least about 25 wt % ethylene that can be recycled to the first stage oligomerization reactor 60. In the embodiment of FIG. 2, no intermediate olefin stream in a net olefin splitter bottoms line 108 comprising C3-C8 olefins is charged back to the oligomerization reactor 70 in the oligomerization olefin stream in line 74. In the embodiment of FIG. 2, the light and intermediate olefins in the net liquid overhead stream may be recycled to the oligomerization unit 50 in line 106 #. Alternatively, the olefin splitter column 90 # may be operated to just recycle light olefins, C2-C3 olefins or C2-C4 olefins, back to the oligomerization unit 50 in line 106 # while forwarding the heavier C4+ oligomers or C5+ oligomers to hydrogenation in the bottoms line 94 #.

Figure 3:
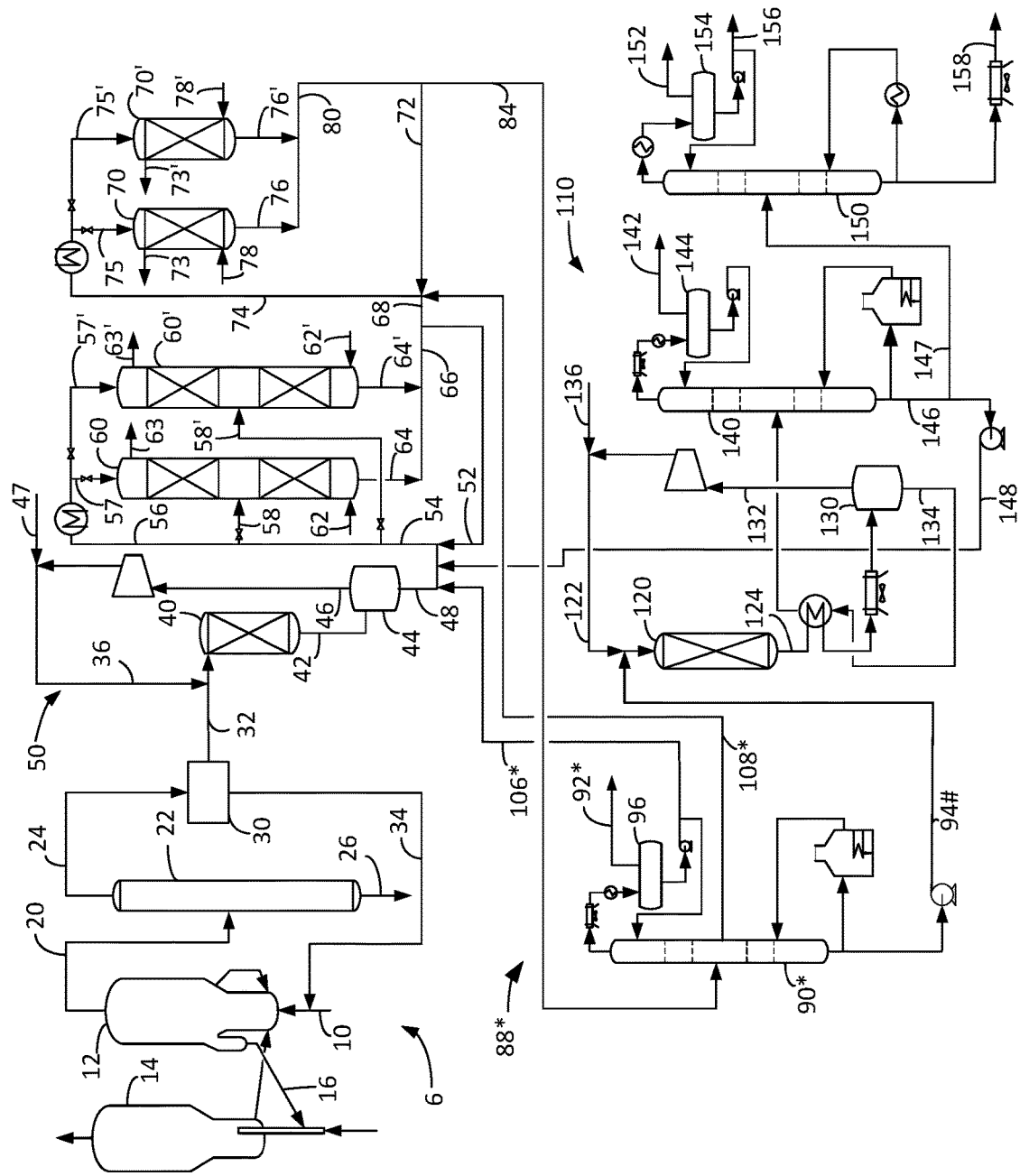
FIG. 3 is a schematic drawing of an additional, alternative process and apparatus of the present disclosure.

In an alternative embodiment in FIG. 3, an intermediate olefin stream is charged back to the second stage oligomerization reactor 70 even though only a single olefin splitter column 90 # is employed in the olefin recovery section 88 #. Elements in FIG. 3 with the same configuration as in FIG. 2 will have the same reference numeral as in FIG. 2. Elements in FIG. 3 which have a different configuration as the corresponding element in FIG. 2 will have the same reference numeral but designated with an asterisk symbol (*). The configuration and operation of the embodiment of FIG. 3 is essentially the same as in FIG. 2 with the noted exceptions.

The olefin splitter column 90* in the olefin recovery section 88* provides a side cut stream in line 108* taken from a side of the column. An intermediate olefin stream in an olefin splitter side line 108* comprising C3-C8 olefins may be recycled to join the charge the first stage oligomerized olefin stream in line 68 along with the oligomerized recycle stream in line 72 to provide the charge second stage oligomerization olefin stream in line 74 to be oligomerized in the second stage oligomerization reactor 70. Additionally, an olefin splitter overhead stream may be condensed and taken as a net liquid overhead stream from the olefin splitter receiver 96 in line 106*. The net liquid olefin splitter overhead stream in line 106* may recycle un-converted ethylene to the feed olefin stream in line 48 along with the diluent stream in line 148 and the first stage oligomerized recycle stream in line 52 to provide the charge olefin stream in line 54 to the first stage oligomerization reactor 60. The net liquid light olefin splitter overhead stream in line 106* may predominantly comprise ethylene that can be recycled to the first stage oligomerization reactor 60.

Figure 4:
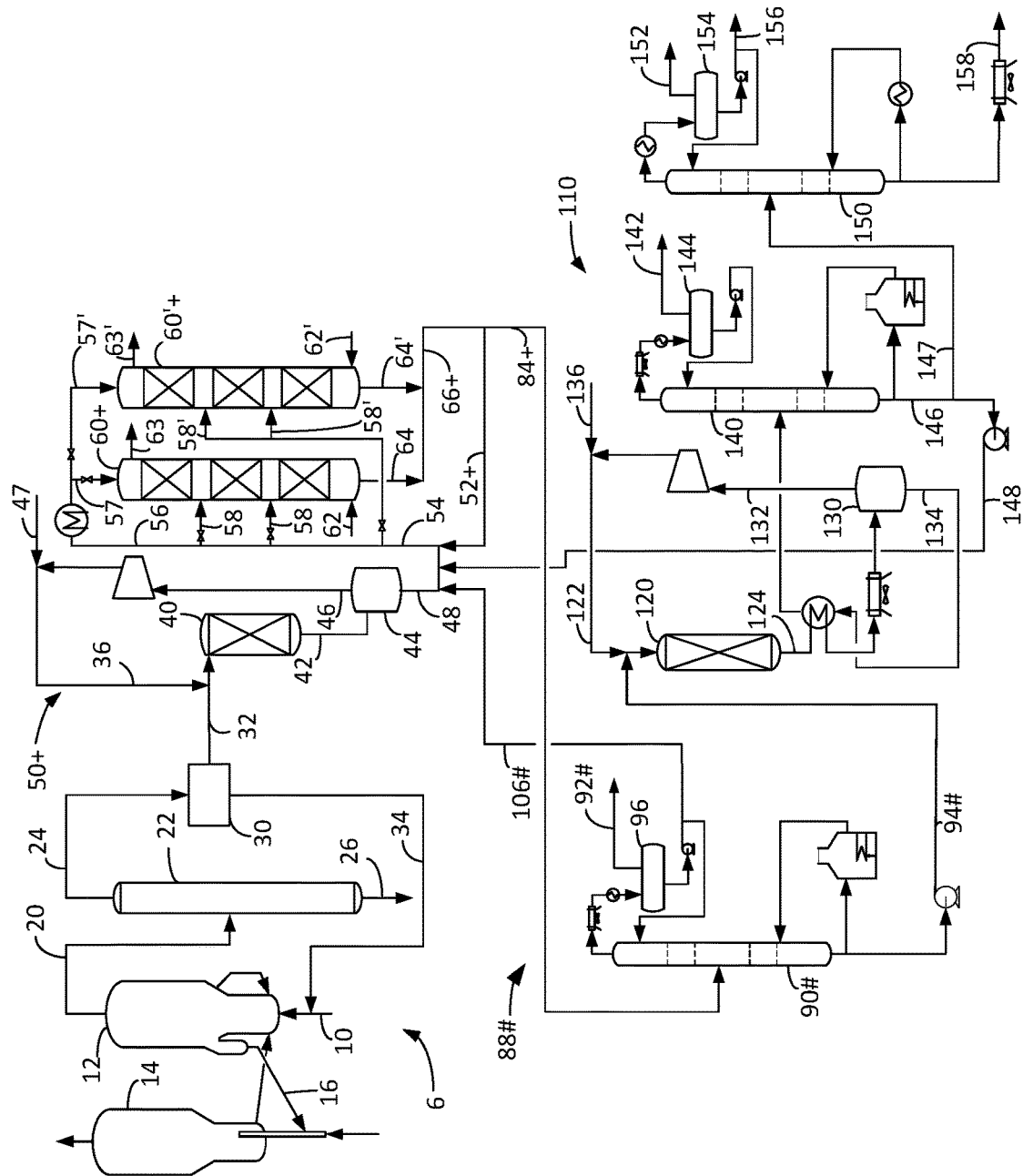
FIG. 4 is a schematic drawing of a further alternative embodiment of FIG. 1.

FIG. 4 depicts an embodiment in which an oligomerization reactor 60+ includes beds of both the first stage oligomerization catalyst and the second stage oligomerization catalyst. Elements in FIG. 4 with the same configuration as in FIG. 2 will have the same reference numeral as in FIG. 2. Elements in FIG. 4 which have a different configuration as the corresponding element in FIG. 2 will have the same reference numeral but designated with a plus symbol (+). The configuration and operation of the embodiment of FIG. 4 is essentially the same as in FIG. 2.

The oligomerization reactor 60+ includes catalyst beds with both first stage oligomerization catalyst and second stage oligomerization catalyst of previous embodiments either stacked or intermingled in the same catalyst bed such that both ethylene and higher olefin conversions occur in the same catalyst bed. In one embodiment, the first stage oligomerization catalyst may be stacked on top of the oligomerization catalyst such that the charge olefins encounter the first stage oligomerization and then the second stage oligomerization. An first stage oligomerized stream comprising the first stage oligomerized olefin and unconverted feed olefins are collected in line 66+ from reactors 60+ and 60'+. An oligomerized recycle stream in line 52+ comprising dimers, oligomers and un-converted feed olefins are recycled to the oligomerization reactor 60+ via the charge olefin stream in line 54. The oligomerized product stream in line 84+ may be fed to the olefin splitter column 90 # for separation. The net liquid light olefin splitter overhead stream in line 106 # and/or the oligomerized recycle stream in line 52+ may comprise at least about 10 wt %, suitably at least about 20 wt % and preferably at least about 25 wt % ethylene that can be recycled to the first stage oligomerization reactor 60.

Figure 5:
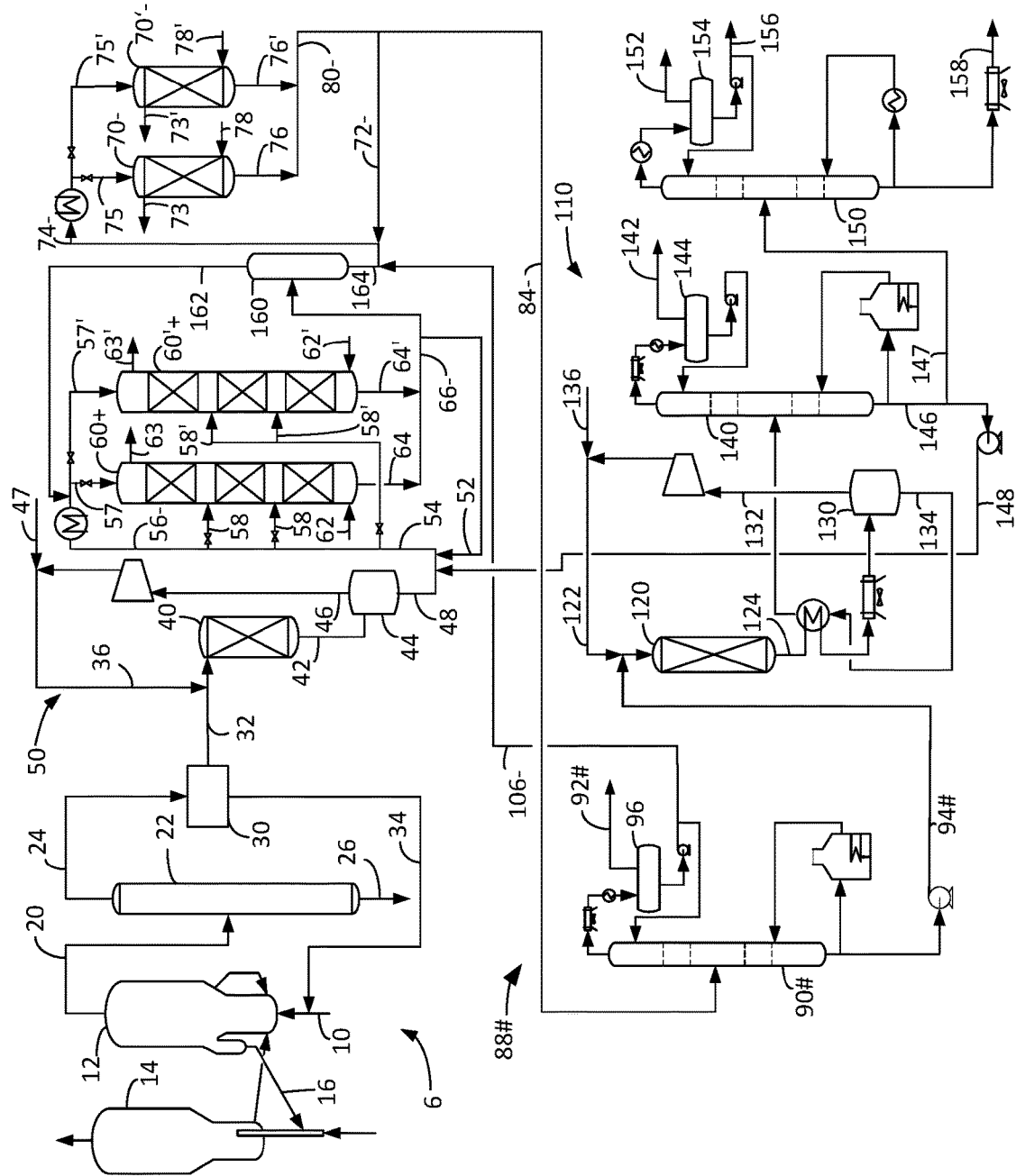
FIG. 5 is a schematic drawing of an alternative embodiment to FIG. 4.

FIG. 5 depicts an embodiment in which a first stage oligomerized olefin stream in line 66+ is fed to an interstage separator 160 for a separation. Elements in FIG. 5 with the same configuration as in FIG. 4 will have the same reference numeral as in FIG. 4. Elements in FIG. 5 which have a different configuration as the corresponding element in FIG. 4 will have the same reference numeral but designated with a dash symbol (–). The configuration and operation of the embodiment of FIG. 5 is essentially the same as in FIG. 4 with the noted exceptions.

The reactor 60+ may include first stage oligomerization catalyst as in the embodiment of FIG. 1. The first stage oligomerized stream in line 66– may be fed to an interstage separator 160 to separate an overhead olefins stream comprising unreacted ethylene in an overhead line 162 from a bottom first stage oligomerized olefin stream in a bottoms line 164. The separator 160 may be operated at a temperature of about 250 to about 300° C. and a pressure of about 40 to about 90 barg. The ethylene in the overhead olefin stream in line 162 may be mixed with the primary charge olefin stream in line 56– and be charged to the first stage oligomerization reactor 60+ or 60'+ in lines 57 or 57', respectively. The overhead olefin stream in line 162 predominantly comprises ethylene. The bottom first oligomerized olefins stream in the bottoms line 164 may be mixed with un-oligomerized recycle olefins in an olefin splitter overhead line 106– and an oligomerized recycle stream in line 72– comprising oligomerized olefins 72 to provide the charge second stage oligomerization olefin stream in line 74– and charged to the second stage oligomerization olefin reactor 70– or 70'–. The second stage oligomerized olefin reactor 70–, 70'– may comprise second stage oligomerization catalyst. The second stage oligomerized product stream in line 84– may be fed to the olefin splitter column 90 # for separation.

Figure 6:
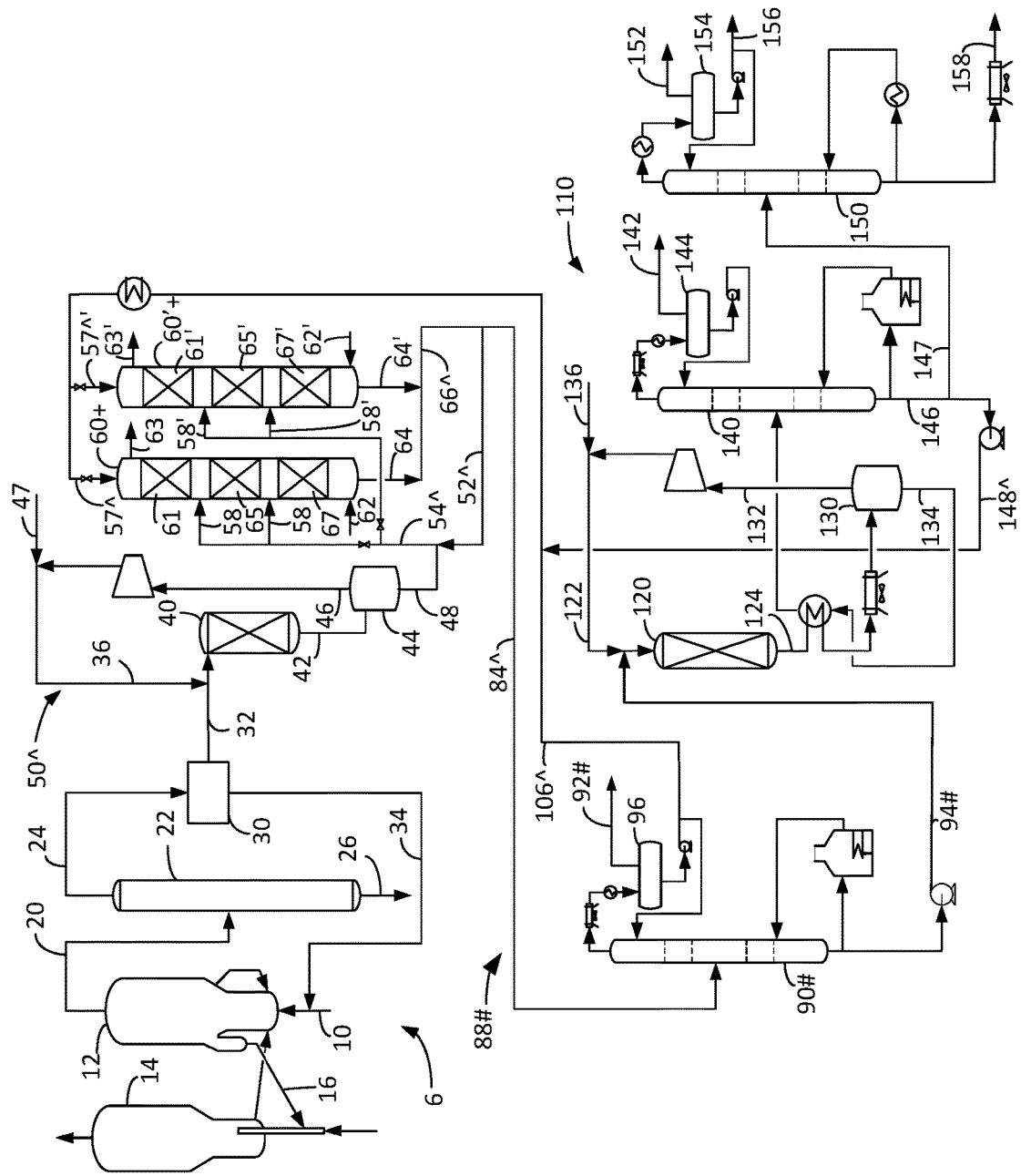
FIG. 6 is a schematic drawing of a further alternative embodiment of FIG. 4.

FIG. 6 depicts an embodiment in which a charge olefin stream in line 54^ is charged to a downstream catalyst bed(s) 65, 67, 65', 67' while recycled ethylene is charged to an upstream catalyst bed 61, 61' in the reactor 60+, 60'+. Elements in FIG. 6 with the same configuration as in FIG. 4 will have the same reference numeral as in FIG. 4. Elements in FIG. 6 which have a different configuration as the corresponding element in FIG. 4 will have the same reference numeral but designated with a carat symbol (^). The configuration and operation of the embodiment of FIG. 6 is essentially the same as in FIG. 4.

The charge olefin stream in line 54^ is delivered by an interbed olefin charge stream in line(s) 58^ to a downstream catalyst bed 65, 67, 65', 67' in the reactor 60+, 60'+ between catalyst beds. The downstream catalyst beds 65, 67, 65', 67' may comprise second stage oligomerization catalyst or may comprise first stage oligomerization catalyst and second stage oligomerization catalyst stacked or intermingled together. An oligomerized olefin stream comprising dimers, oligomers and un-converted feed olefins in line 64 or 64' is collected in line 66^. An oligomerized recycle stream in line 52^ comprising dimers, oligomers and un-converted feed olefins taken from the oligomerized olefin stream in line 66^ is recycled to the oligomerization reactor 60+, 60'+ via the charge olefin stream in line 54^. The oligomerized product stream in line 84^ taken from the oligomerized olefin stream in line 66^ and having the same composition thereof may be fed to the olefin splitter column 90 # for separation.

In the olefin separation column 90 #, fractionation is conducted to separate the light and intermediate olefins in the net liquid overhead stream for recycle to the oligomerization unit 50^ in line 106^. Preferably, the olefin splitter column 90 # may be operated to just recycle un-converted ethylene back to the first stage oligomerization unit 50^ in line 106^ while forwarding the heavier oligomers to hydrogenation in the bottoms line 94 #. The net liquid light olefin splitter overhead stream in line 106^ may predominantly comprise ethylene that can be recycled to the oligomerization reactor 60+, 60'+ in primary charge line 57^, 57'^, respectively, after mixing with diluent stream comprising paraffins which may be a net stripped hydrogenated stream in line 148^.

The net liquid overhead stream in line 106^ may be heated if necessary and passed by the primary charge line 57^, 57'^ to the upstream catalyst bed(s) 61, 61' which may contain only the first stage oligomerization catalyst or may contain the first stage and second stage oligomerization catalyst stacked or intermingled together. By recycling an ethylene predominant stream to the upstream end of the reactor 60+, 60+' the exotherm may be more easily controlled.

Starting with methanol, ethanol or even carbon dioxide, the disclosed oligomerization process can produce jet fuel and diesel fuel from ethylene or propylene that meets applicable fuel requirements.

EXAMPLES

Example 1

We prepared catalyst supports using the oil drop method previously described which combines the syntheses and shape formation in one single, continuous step to achieve compositional homogeneity with aluminum oxide being fully dispersed into the silica matrix. One catalyst of Example 2 was made with CCIC powder including a crystalline alumina phase dispersed throughout the support. Examples of catalyst supports prepared by the prescribed method are shown in Table 1 below.

TABLE 1

Amorphous Silica Alumina-Composition, Porosity/Density and Surface Areas

| | Units | Comp. Ex. 1 | Ex. 2 | Ex. 3 | Ex. 4 | Ex. 5 | Ex. 6 | Comp. Ex. 7 |
|---|---|---|---|---|---|---|---|---|
| Description | | oil drop sphere | CCIC powder | oil drop sphere | oil drop sphere | oil drop sphere | oil drop sphere | oil drop sphere |
| Size | | 1/16" | 70 um | 1/16 or 1/32" | 1/16" | 1/16" | 1/16" | 1/16" |
| Compositions | | | | | | | | |
| $SiO_2$ | wt % | 33 | 72 | 75 | 90 | 90 | 97.5 | 100 |
| $Al_2O_3$ | wt % | 67 | 28 | 25 | 10 | 10 | 2.5 | 0 |
| $Si/Al_2$ | molar | 0.84 | 4.37 | 5.10 | 15.30 | 15.30 | 66.30 | — |
| Hg intrusion | | | | | | | | |
| Total Pore Area | m2/g | | — | 380 | 434. | 540 | 616 | — |
| Total Intrusion Volume | cc/g | | — | 0.571 | 0.526 | 1.070 | 0.877 | 1.401 |
| Median Pore Diameter | A | | — | 63 | 47 | 77 | 49 | 157 |
| Bulk Density | g/cc | | — | 0.971 | 0.930 | 0.706 | 0.855 | 0.537 |
| Porosity | % | | — | 55.0 | 48.8 | 75.4 | 74.8 | — |
| $N_2$ adsorption | | | | | | | | |
| Surface Area, BET | m2/g | 304 | 526 | 306-383 | — | 343 | 533 | 169 |
| Pore Volume | cc/g | 0.939 | 0.749 | 0.63-0.692 | — | 0.895 | 1.125 | 1.175 |
| Pore Diameter | A | 124 | 57 | 72-83 | — | 104 | 84 | |

Example 2

Metals were incorporated on supports of Table 1, using an evaporative impregnation or an ion exchange method, to provide the catalyst of Table 2.

Example 3

To demonstrate the utility of prescribed catalysts, selective catalysts in Table 2 were tested for converting ethylene to dimer and oligomer. In one apparatus the test is conduct

TABLE 2

Oil Dropping Catalysts for Converting C2-C4 Olefin

| | Support Si/Al2 | Description | ABD, gm/ml | Na, Li or K | Ni | Li, Na, K/Al | Ni/Al | (M + 2Ni)/Al |
|---|---|---|---|---|---|---|---|---|
| Comp. Ex. 1.1 | 1.1 | 0.1M Ni/0.2 MEDA IE | 0.503 | 0.11 | 1.96 | 0.004 | 0.028 | 0.060 |
| Ex. 3.1 | 5.1 | Evaporative Impregnation | 0.633 | 0.01 | 3.00 | 0.001 | 0.105 | 0.211 |
| Ex.3.2 | 5.1 | 0.1M Ni/0.2 MEDA IE | 0.630 | 0.05 | 1.77 | 0.004 | 0.061 | 0.125 |
| Ex.4.1 | 14.2 | Na—Ni-sequential IE | 0.530 | 0.25 | 0.85 | 0.052 | 0.069 | 0.190 |
| Ex.4.2 | 14.2 | Li—Ni-sequential IE | 0.530 | 0.09 | 1.52 | 0.063 | 0.124 | 0.312 |
| Ex.4.3 | 14.3 | K—Ni-sequential IE | 0.530 | 1.10 | 1.39 | 0.138 | 0.116 | 0.370 |
| Ex.5.1 | 13.9 | Na—Ni-sequential IE | 0.420 | 0.22 | 0.88 | 0.046 | 0.072 | 0.191 |
| Ex.6.1 | 57.9 | Na—Ni-sequential IE | 0.469 | 0.13 | 0.97 | 0.101 | 0.295 | 0.692 |
| Ex.6.2 | 71.6 | K—Ni-sequential IE | 0.470 | 0.35 | 0.91 | 0.200 | 0.346 | 0.891 |
| Comp. Ex.7.1 | $SiO_2$ | 1M Ni IE | — | — | 4.14 | — | — | — | at 6.2 MIPa (g) (900 psig) using chemical grade ethylene feed. In this test normal butane at a nominal n-butane to ethylene ratio of 4 on a weight basis is used as a diluent to mitigate the heat of reaction. Tests were done at catalyst loading ranging from about 15 to 40 grams and at combined feed rates to attain about 5.0 hr$^{-1}$ WHSV on the total feed rate bases. The catalyst was pre-dried at temperatures ranging from 300 to 400° C. in flowing nitrogen until the effluent dew point stabilized at around −40 to −50° C. Normal butane and ethylene were pre-dried using 3A and the 13X molecular sieves in series. The product effluent passed through a high-pressure separator and the resulting liquid stream was analyzed by online GC gas chromatography using PONA and alumina columns. The overhead gas was analyzed by an alumina column for light paraffin, light olefin, paraffin/olefin/naphthene/aromatics ratios in the naphtha and distillate ranges. Testing results of Example Catalysts 5.1 and 6.1 are shown in Tables 3 and 4 below.

TABLE 3

Example 3.1 Ethylene to Distillate-Example Catalyst 5.1 Oil Drop Sphere

| Hours on Stream | 0 | 79 | 172 | 394 |
|---|---|---|---|---|
| Block Temp., ° C. | 130 | 120 | 100 | 120 |
| nC4/C2 = molar | 1.931 | 1.931 | 1.931 | 1.931 |
| WHSV FF (Total, hr$^{-1}$) | 5.0 | 5.0 | 5.0 | 5.0 |
| C2 = conv., % | 93.9 | 85.5 | 90.3 | 91.9 |
| Product Yields | | | | |
| C2-C7 PNA | 0.94 | 0.80 | 0.89 | 0.79 |
| C4-C7= | 43.36 | 55.20 | 54.30 | 50.27 |
| C8-C16 | 46.34 | 27.26 | 31.95 | 37.62 |
| C17-C20+ | 3.25 | 2.42 | 3.12 | 3.22 |
| Sum | 93.88 | 85.69 | 90.26 | 91.89 |

TABLE 4

Example 3.2 Ethylene to Distillate-Example Catalyst 6.1 Oil Drop Sphere

| Hours on Stream | 34.00 | 61.00 | 116.00 | 197.00 |
|---|---|---|---|---|
| Block Temp., ° C. | 60.00 | 60.00 | 105.00 | 130.00 |
| nC4/C2 = molar | 1.93 | 1.93 | 1.93 | 1.93 |
| WHSV FF (Total, hr$^{-1}$) | 5.40 | 5.40 | 5.40 | 5.40 |
| C2 = conv., % | 98.60 | 96.31 | 94.16 | 95.23 |
| Product Yields | | | | |
| C2-C7 P | 0.44 | 0.79 | 1.02 | 0.95 |
| C4-C7= | 83.77 | 83.57 | 81.11 | 79.19 |
| C8-C16 | 14.23 | 11.86 | 11.94 | 15.04 |
| C17-C20+ | 0.16 | 0.09 | 0.08 | 0.05 |
| Sum | 98.60 | 96.31 | 94.16 | 95.23 |

When testing with n-butane co-feed as a heat mediating diluent at a substantial space velocity, Example Catalysts 5.1 and 6.1 exhibited stable ethylene conversion greater than 90%, C8-C16 distillate yields of 30-50 wt % and 10-15 wt %, respectively, approaching 400 and 200 hours, respectively.

Example Catalyst 3.2 was prepared on an oil dropping spheric support of Example 3 but in a size of 1/32" diameter. When testing Example Catalyst 3.2 as per the prescribed testing method, greater than 90% ethylene conversion at C8-C16 yields at 20-40% were achieved as shown in Table 5 below.

TABLE 5

Example 3.3 Ethylene to Distillate-Example Catalyst 3.2 Oil Drop Sphere

| Hours on Stream | 16 | 33 |
|---|---|---|
| Block Temp., ° C. | 60 | 60 |
| nC4/C2 = molar | 1.45 | 2.41 |
| WHSV FF (Total, hr$^{-1}$) | 2.7 | 6.0 |
| C2 = conv., % | 99.1 | 90.9 |
| Product Yields | | |
| C2-C7 P | 1.50 | 1.57 |
| C4-C7= | 53.42 | 65.15 |
| C8-C16 | 41.26 | 23.13 |
| C17-C20+ | 2.88 | 1.04 |
| Sum | 99.1 | 90.9 |

Comparative Example Catalyst 1.1 was prepared on an oil dropped spheric support of Comparative Example 1. When testing Comparative Example Catalyst 1.1 as per the prescribed testing method, catalyst activity as measured by ethylene conversion and C8-C16 yield was very low especially under conditions of a diluent to ethylene ratio for adequate heat mediating as shown in Table 6 below. The catalyst contains crystalline alumina phase as per x-ray diffraction and nickel aluminate spinel phase indicated by x-ray diffraction and verified by XANES (X-Ray Absorption Near Edge Structure).

TABLE 6

Example 3.4 Ethylene to Distillate-Comparative Example Catalyst 1.1 Oil Drop Sphere

| Hours on Stream | 16 | 27 |
|---|---|---|
| Block Temp., ° C. | 60 | 60 |
| nC4/C2 = molar | 1.45 | 2.41 |
| WHSV FF (Total, hr$^{-1}$) | 2.0 | 6.0 |
| C2 = conv., % | 88.32 | 9.5 |
| Product Yields | | |
| C2-C7 P | 0.89 | 0.73 |
| C4-C7= | 81.22 | 8.53 |
| C8-C16 | 6.11 | 0.19 |
| C17-C20+ | 0.09 | 0.02 |
| Sum | 88.3 | 9.5 |

Example 4

In another test we assessed various catalysts using 100% ethylene and a C2-C4 olefin feed blend comprising 30-40 wt % ethylene, 40-55 wt % propylene and 15 wt % butylene simulating olefin mixtures coming off MTO unit, respectively. In these tests n-butane was also used as a diluent for mitigating the heat of reaction and the operating pressures were kept at about 60 bar (g) (870 psig) to about 62 bar (g) (900 psig). In one test the C2-C4 olefin mixture is tested over MTT catalyst, Example 4.1, and in another tested ethylene feed was tested over nickel on amorphous silica alumina (ASA) catalyst, Example 4.2. In the third test Example 4.3 nickel on amorphous silica alumina and MTT catalyst was tested in stacked configuration using the prescribed C2-C4 olefin blend. Nickel was incorporated onto ASA oil dropping sphere support Example 3 of 75 SiO$_2$ and 25% Al$_2$O$_3$ inl/16" diameter using evaporative impregnation technique to give Example catalyst 3.1. MTT catalyst was prepared by extruding zeolite MTT of about 45 Si/Al$_2$ and boehmite alumina at 25/75 zeolite/alumina formation and calcined at 550° C. for 2 hours in flowing air. In the former, nickel was incorporated onto an amorphous silica alumina spherical support of 75 mol % $SiO_2$ and 25 mol % $Al_2O_3$ made using the prescribed oil dropping process. Normal butane was used as a diluent in all three tests. Ten grams of whole catalysts were loaded in test Examples 4.1 and 4.2 using the prescribed C2-C4 olefin mixture and 100% ethylene, respectively. In test Example 4.3 a stacked loading of 5 grams of Example Catalyst 3.1 made of amorphous silica alumina and 10 grams zeolite catalyst made of 25% MTT and 75% alumina were loaded. Results are shown below in Table 7.

greater than 90% conversions for ethylene, propylene and mixed butene without increasing the overall contact times, see Table 7.

Example 5

SAPO-18 powder syntheses were conducted in a two-liter autoclave by first adding a desired quantity of structure directing template such diisopropylethylamine (DIPEA) to a previously made solution of phosphoric acid in cold/icy water. The reaction mixture was stirred while desired quantities of silica and alumina precursors (Ludox colloidal silica

TABLE 7

Conversion of MTO Olefins to Distillate

| | Example 4.1 | | | | Example 4.3 | | | | Example 4.2 |
|---|---|---|---|---|---|---|---|---|---|
| Feeds | | | | | | | | | |
| | C2-C4 olefin | | | | C2-C4 olefin | | | | C2 olefin |
| Catalyst | | | | | | | | | |
| | Zeolite Catalyst-25/75% MTT/Al2O3 | | | | Stack Ni on ASA (Ex. 3.1) & Zeolite 25/75 MTT/Al2O3 | | | | Ni on ASA (Ex. 3.1) |
| Avg. Temp, ° C. | 195.4 | 197.9 | 220.3 | 224.8 | 187.6 | 187.9 | 213.3 | 212.1 | 210.6 |
| Olefin WHSV, hr$^{-1}$ | 0.73 | 0.66 | 0.7 | 0.8 | 0.39 | 0.46 | 0.88 | 0.91 | 1.24 |
| Diluent to Olefin, w/w | 2.19 | 1.93 | 2.02 | 2.16 | 2.54 | 2.1 | 2.15 | 2.74 | 3.54 |
| Hours on Stream | 42.5 | 55.5 | 60.5 | 67.5 | 14.0 | 24 | 209.4 | 216.4 | 12.0 |
| C2= conversion | 49.59 | 55.46 | 78.23 | 68.48 | 99.52 | 99.47 | 83.22 | 88.28 | 98.1 |
| C3= conversion | 99.25 | 98.58 | 99.72 | 99.84 | 99.89 | 99.91 | 99.67 | 99.74 | |
| C4= conversion | 90.88 | 89.37 | 94.84 | 94.64 | 99.44 | 98.9 | 94.18 | 93.69 | |
| Yields, % | | | | | | | | | |
| C4= | 1.34 | 1.74 | 0.79 | 0.72 | 0.10 | 0.17 | 0.95 | 0.99 | 30.30 |
| C5s-C8s | 27.44 | 28.1 | 26.6 | 26.32 | 21.01 | 20.44 | 22.23 | 21.96 | 38.9 |
| C9s-C14s | 47.31 | 50.8 | 58.2 | 53.01 | 71.84 | 69.3 | 66.31 | 66.7 | 26.2 |
| C15+ | 3.64 | 4.1 | 5.4 | 5.15 | 6.44 | 9.51 | 3.06 | 4.77 | 1.1 |
| C8s-C15s, % | 59.10 | 62.91 | 71.86 | 66.97 | 85.34 | 83.87 | 82.35 | 82.14 | 46.82 |
| Total C5+ | 78.4 | 83 | 90.2 | 84.5 | 99.29 | 99.25 | 93.26 | 93.26 | 66.2 |
| Calculated Feed Compositions | | | | | | | | | |
| Feed C2= wt % | 37.2 | 30.1 | 34.4 | 42.5 | 20.9 | 33.9 | 30.5 | 32.9 | 100 |
| Feed C3= wt % | 47.8 | 53.2 | 49.9 | 43.8 | 60.2 | 50.3 | 52.9 | 51.1 | 0 |
| Feed C4= wt % | 15.0 | 16.7 | 15.7 | 13.7 | 18.9 | 15.8 | 16.6 | 16.0 | 0 |

As shown in Table 7, zeolitic catalyst of 25% MTT and 75% alumina converted propylene and mixed butene readily to levels greater than 90% and convert ethylene to moderate levels of 40 to 70%, when operating between 190 to 230° C. average bed temperatures in test Example 4.1. Nickel catalyst on amorphous silica alumina oil drop spheres, Example Catalyst 3.1, exhibited on the other hand converted ethylene near 100% in test Example 4.2. Test Examples 4.1 and 4.2 appear to show that nickel on amorphous silica alumina oil drop spheres can attain greater than 90% ethylene conversion in the presence of hydrocarbon diluents over a wide range of temperatures, from about 60 to about 210° C. When combining nickel on amorphous silica alumina support and zeolite catalyst as shown in test Example 4.3, one can attain and Versal 251 alumina, respectively) were added in sequential steps separated by about 5-minute intervals. The reaction slurry was then transferred into the reactor and the reactor was then sealed and heated from room temperature to about 175° C. at a rate of 15° C./hr. and a 300 RPM stir rate. Once the set-point temperature was reached, the reactor was allowed to stir for 48 hours, at which point the reactor was cooled, and the product powder was washed and isolated via centrifugation. The synthesized MTT was $NH_4+$ ion exchanged, dried, bound with alumina binder and calcined. Alternatively, the synthesized MTT may be calcined also before ion exchange and the binder are added. The typical yield equaling the ratio of mass of calcined powder to total mass of synthesis gel was about 17%.

Specific Embodiments

While the following is described in conjunction with specific embodiments, it will be understood that this description is intended to illustrate and not limit the scope of the preceding description and the appended claims.

A first embodiment of the disclosure is a process for oligomerizing an olefin stream comprising oligomerizing the olefin stream with a first stage oligomerization catalyst to provide first stage oligomerized olefin stream; and; oligomerizing the first stage oligomerized olefin stream with an oligomerization catalyst to provide a second stage oligomerized olefin stream; and recycling an ethylene stream to the first stage oligomerization step. An embodiment of the disclosure is one, any or all of prior embodiments in this paragraph up through the first embodiment in this paragraph wherein the first stage oligomerization catalyst comprises metal on amorphous silica alumina. An embodiment of the disclosure is one, any or all of prior embodiments in this paragraph up through the first embodiment in this paragraph wherein the first stage or the second stage oligomerization catalyst comprises one or more of MRE, TON, MTT, MFS, MFI, MEL, AFO, AEL, EUO and FER. An embodiment of the disclosure is one, any or all of prior embodiments in this paragraph up through the first embodiment in this paragraph wherein the first stage oligomerization catalyst or the second stage oligomerization catalyst is regenerated by contact with air. An embodiment of the disclosure is one, any or all of prior embodiments in this paragraph up through the first embodiment in this paragraph further comprising recycling oligomerized olefins from the second stage oligomerized stream to the second stage oligomerization step. An embodiment of the disclosure is one, any or all of prior embodiments in this paragraph up through the first embodiment in this paragraph further comprising recycling the first stage oligomerized olefins to the first stage oligomerization step. An embodiment of the disclosure is one, any or all of prior embodiments in this paragraph up through the first embodiment in this paragraph further comprising separating an ethylene stream from the first stage oligomerized olefin stream and recycling the ethylene stream to the first stage oligomerization step. An embodiment of the disclosure is one, any or all of prior embodiments in this paragraph up through the first embodiment in this paragraph wherein the second stage oligomerization step is downstream of the first stage oligomerization step. An embodiment of the disclosure is one, any or all of prior embodiments in this paragraph up through the first embodiment in this paragraph further comprising separating an ethylene stream from the second stage oligomerized olefin stream and recycling the ethylene stream to the first oligomerization step. An embodiment of the disclosure is one, any or all of prior embodiments in this paragraph up through the first embodiment in this paragraph further comprising separating an intermediate olefin stream from the second stage oligomerized olefin stream and recycling the intermediate olefin stream to the second stage oligomerization step. An embodiment of the disclosure is one, any or all of prior embodiments in this paragraph up through the first embodiment in this paragraph further comprising separating a distillate olefin stream from the second stage oligomerized olefin stream and hydrogenating the distillate olefin stream. An embodiment of the disclosure is one, any or all of prior embodiments in this paragraph up through the first embodiment in this paragraph further comprising separating a hydrogenated distillate stream into a jet stream and a diesel stream. An embodiment of the disclosure is one, any or all of prior embodiments in this paragraph up through the first embodiment in this paragraph further comprising taking a diluent stream from a hydrogenated distillate stream and charging the diluent stream to the first stage oligomerization step. An embodiment of the disclosure is one, any or all of prior embodiments in this paragraph up through the first embodiment in this paragraph wherein the olefin stream comprises at least about 5 wt % ethylene.

A second embodiment of the disclosure is a process for converting methanol to distillate fuel comprising contacting an oxygenate stream with an MTO catalyst to produce an olefin stream; and oligomerizing the olefin stream with an oligomerization catalyst to produce an oligomerized olefin stream. An embodiment of the disclosure is one, any or all of prior embodiments in this paragraph up through the second embodiment in this paragraph wherein the oligomerizing step further comprises first oligomerizing the olefin stream with a first stage oligomerization catalyst to produce first stage oligomerized olefin stream; and oligomerizing the first stage oligomerized olefin stream. An embodiment of the disclosure is one, any or all of prior embodiments in this paragraph up through the second embodiment in this paragraph further comprising separating an ethylene stream and an intermediate olefin stream from the oligomerized olefin stream and recycling the ethylene stream to the first stage oligomerization step and recycling the intermediate olefin stream to the second stage oligomerization step.

A third embodiment of the disclosure is a process for converting ethylene to distillate fuel comprising oligomerizing the ethylene stream with a first stage oligomerization catalyst to produce first stage oligomerized olefin stream; oligomerizing the first stage oligomerized olefin stream with an second stage oligomerization catalyst to produce a second stage oligomerized olefin stream; separating a distillate olefin stream from the second stage oligomerized olefin stream; and saturating the distillate olefin stream to provide distillate fuel. An embodiment of the disclosure is one, any or all of prior embodiments in this paragraph up through the third embodiment in this paragraph further comprising separating an ethylene stream and an intermediate olefin stream from the second stage oligomerized olefin stream and recycling the ethylene stream to the first stage oligomerization step and recycling the intermediate olefin stream to the second stage oligomerization step. An embodiment of the disclosure is one, any or all of prior embodiments in this paragraph up through the third embodiment in this paragraph wherein the ethylene stream is obtained by contacting an oxygenate stream with an MTO catalyst to produce an olefin stream. An embodiment of the disclosure is one, any or all of prior embodiments in this paragraph up through the third embodiment in this paragraph wherein the olefin stream comprises at least about 5 wt % ethylene.

A fourth embodiment of the disclosure is a process for converting ethylene comprising oligomerizing an ethylene stream with an oligomerization catalyst comprising a Group VIII metal on silica aluminum oxide support wherein the support comprises about 70 to about 99.5 wt % SiO2. An embodiment of the disclosure is one, any or all of prior embodiments in this paragraph up through the fourth embodiment in this paragraph wherein the support comprises about 70 to about 99.5 wt % SiO2. An embodiment of the disclosure is one, any or all of prior embodiments in this paragraph up through the fourth embodiment in this paragraph wherein the aluminum oxide is fully dispersed in the silica matrix. An embodiment of the disclosure is one, any or all of prior embodiments in this paragraph up through the fourth embodiment in this paragraph wherein the aluminum oxide is non-crystalline. An embodiment of the disclosure is one, any or all of prior embodiments in this paragraph up through the fourth embodiment in this paragraph wherein the support is synthesized and formed into a shape in one single step. An embodiment of the disclosure is one, any or all of prior embodiments in this paragraph up through the fourth embodiment in this paragraph wherein the support is an oil dropped sphere. An embodiment of the disclosure is one, any or all of prior embodiments in this paragraph up through the fourth embodiment in this paragraph wherein the support has a surface area of between about 300 and about 600 m2/g as determined by nitrogen BET. An embodiment of the disclosure is one, any or all of prior embodiments in this paragraph up through the fourth embodiment in this paragraph wherein the porosity of the support as measured by total mercury intrusion volume is about 0.40 to about 1.4 ml/g. An embodiment of the disclosure is one, any or all of prior embodiments in this paragraph up through the fourth embodiment in this paragraph wherein the Group VIII metal is nickel. An embodiment of the disclosure is one, any or all of prior embodiments in this paragraph up through the fourth embodiment in this paragraph wherein the molar ratio of Group VIII metal to Al2 in the catalyst is from about 0.04 to about 0.70. An embodiment of the disclosure is one, any or all of prior embodiments in this paragraph up through the fourth embodiment in this paragraph wherein the catalyst also includes a Group IA metal wherein the molar ratio of the Group IA metal to aluminum is about 0.04 to about 0.4.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for oligomerizing an olefin stream comprising:
   oligomerizing said olefin stream, as a first stage oligomerization step, with a first stage oligomerization catalyst to provide a first stage oligomerized olefin stream;
   oligomerizing said first stage oligomerized olefin stream, as a second stage oligomerization step, with a second stage oligomerization catalyst to provide a second stage oligomerized olefin stream;
   separating a distillate olefin stream from said second stage oligomerized olefin stream and hydrotreating said distillate olefin stream;
   feeding the hydrotreated distillate olefin stream to a stripper column;
   taking a C9+ paraffin diluent stream from a bottoms stream from said stripper column and charging said diluent stream to said first stage oligomerization step, wherein the diluent stream is provided at a diluent-to-feed weight ratio of 2:1 to 5:1; and
   separating an ethylene stream from said first stage oligomerized olefin stream and/or said second stage oligomerized olefin stream and recycling said ethylene stream to the first stage oligomerization step.

2. The process of claim 1 wherein said first stage oligomerization catalyst comprises a metal on amorphous silica alumina.

3. The process of claim 1 wherein said first stage or said second stage oligomerization catalyst comprises one or more zeolites having a structure selected from MRE, TON, MTT, MFS, MFI, MEL, AFO, AEL, EUO and FER.

4. The process of claim 1 wherein the first stage oligomerization catalyst or the second stage oligomerization catalyst is regenerated by contact with air.

5. The process of claim 1 further comprising recycling oligomerized olefins from said second stage oligomerized stream to said second stage oligomerization step.

6. The process of claim 1 further comprising recycling a portion of the first stage oligomerized olefin stream to said first stage oligomerization step.

7. The process of claim 6 wherein said second stage oligomerization step is downstream of said first stage oligomerization step.

8. The process of claim 6 further comprising separating an ethylene stream from said second stage oligomerized olefin stream and recycling said ethylene stream to the first oligomerization step.

9. The process of claim 1 further comprising separating an ethylene stream from said first stage oligomerized olefin stream and recycling said ethylene stream to the first stage oligomerization step.

10. The process of claim 1 further comprising separating an intermediate olefin stream from said second stage oligomerized olefin stream and recycling said intermediate olefin stream to said second stage oligomerization step.

11. The process of claim 1 further comprising separating a portion of said bottoms stream into a jet stream and a diesel stream.

12. The process of claim 1 wherein said olefin stream comprises at least about 5 wt % ethylene.

13. A process for converting methanol to distillate fuel comprising:
    contacting an oxygenate stream with a methanol-to-olefin (MTO) catalyst to produce an olefin stream;
    recovering a deoxygenated olefin stream from said olefin stream;
    selectively hydrogenating said deoxygenated olefin stream to produce a selectively hydrogenated olefin stream;
    oligomerizing said selectively hydrogenated olefin stream, as a first stage oligomerization step, with an oligomerization catalyst to produce an oligomerized olefin stream;
    oligomerizing said oligomerized olefin stream, as a second stage oligomerization step, to provide a second stage oligomerized olefin stream;
    separating a distillate olefin stream from said second stage oligomerized olefin stream;
    hydrogenating said distillate olefin stream to provide a hydrogenated distillate olefin stream comprising distillate fuel; and
    feeding the hydrogenated distillate olefin stream to a stripper column;
    taking a C9+ paraffin diluent stream from a bottoms stream from said stripper column and charging said diluent stream to said first stage oligomerization step, wherein the diluent stream is provided at a diluent-to-feed weight ratio of 2:1 to 5:1.

14. The process of claim 13 wherein said oligomerizing said selectively hydrogenated olefin stream is conducted with a first stage oligomerization catalyst.

15. The process of claim 13 further comprising separating an ethylene stream and an intermediate olefin stream from said oligomerized olefin stream and recycling said ethylene stream to said first stage oligomerization step and recycling said intermediate olefin stream to said second stage oligomerization step.

16. A process for converting ethylene to distillate fuel comprising:

oligomerizing said ethylene stream, as a first stage oligomerization step, with a first stage oligomerization catalyst to produce a first stage oligomerized olefin stream;

oligomerizing said first stage oligomerized olefin stream, as a second stage oligomerization step, with a second stage oligomerization catalyst to produce a second stage oligomerized olefin stream;

separating a distillate olefin stream from said second stage oligomerized olefin stream;

hydrogenating said distillate olefin stream to provide a hydrogenated distillate olefin stream comprising distillate fuel; and feeding the hydrogenated distillate olefin stream to a stripper column;

taking a C9+ paraffin diluent stream from a bottoms stream from said stripper column and charging said diluent stream to said first stage oligomerization step, wherein the diluent stream is provided at a diluent-to-feed weight ratio of 2:1 to 5:1.

17. The process of claim 16 further comprising separating an ethylene stream and an intermediate olefin stream from said second stage oligomerized olefin stream and recycling said ethylene stream to the first stage oligomerization step and recycling said intermediate olefin stream to said second stage oligomerization step.

18. The process of claim 16 wherein the ethylene stream is obtained by contacting an oxygenate stream with an MTO catalyst to produce an olefin stream.

19. The process of claim 16 wherein said olefin stream comprises at least about 5 wt % ethylene.

* * * * *